United States Patent
Seo et al.

(10) Patent No.: US 8,509,142 B2
(45) Date of Patent: *Aug. 13, 2013

(54) METHOD FOR SIGNALING OF RESOURCE ALLOCATION TO ADJUST GRANULARITY IN CELLULAR MULTI-CARRIER SYSTEM

(71) Applicant: LG Electronics Inc., Seoul (KR)

(72) Inventors: Dong Youn Seo, Anyang-Si (KR); Jung Hoon Lee, Anyang-Si (KR); Ki Jun Kim, Anyang-Si (KR); Joon Kui Ahn, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,206

(22) Filed: Jan. 15, 2013

(65) Prior Publication Data

US 2013/0128844 A1    May 23, 2013

Related U.S. Application Data

(63) Continuation of application No. 12/987,911, filed on Jan. 10, 2011, now Pat. No. 8,374,119, which is a continuation of application No. 12/421,877, filed on Apr. 10, 2009, now Pat. No. 7,885,221.

(60) Provisional application No. 61/075,010, filed on Jun. 24, 2008, provisional application No. 61/074,131, filed on Jun. 19, 2008.

(30) Foreign Application Priority Data

Dec. 30, 2008 (KR) .................. 10-2008-0136669

(51) Int. Cl.
*H04B 7/212* (2006.01)

(52) U.S. Cl.
USPC ........... 370/321; 370/329; 370/322; 370/326; 455/450; 455/452.1; 455/451

(58) Field of Classification Search
USPC ................. 370/321, 329, 322, 326; 455/450, 455/451, 452, 1, 464
See application file for complete search history.

(56) References Cited

U.S. PATENT DOCUMENTS 7,068,628 B2   6/2006   Li et al.
7,885,221 B2   2/2011   Seo et al.
(Continued)

FOREIGN PATENT DOCUMENTS

JP   2008-53857 A   3/2008
(Continued)

OTHER PUBLICATIONS

3GPP, "Technical Specification Group Radio Access Network; Evolved Universal Terrestrial Radio Access (E-UTRA); Physical layer procedures, (Release 8)," 3GPP TS 36.213, V8.2.0, Mar. 2008, pp. 13-14.

(Continued)

*Primary Examiner* — Kibrom T Hailu
*Assistant Examiner* — Zewdu A Beyen
(74) *Attorney, Agent, or Firm* — Birch, Stewart, Kolasch & Birch, LLP

(57) ABSTRACT

A method for adjusting a granularity of resource allocation in a wireless mobile communication system supporting a compact scheduling is discussed. A resource indication value (RIV) corresponds to a start index (S) of one set of consecutive virtual resource blocks (VRBs) and a length of the VRBs. The start index (S) is selected from among 's' values (where $s=P+mT<N_{RB}$), and the length (L) is selected from among 'l' values (where $l=K+nG \leq N_{RB}$). Here, P is a predetermined integer of 0 or higher, T or G is a predetermined natural number, m is an integer of 0 or higher, and n is a natural number.

10 Claims, 17 Drawing Sheets

(56) References Cited

U.S. PATENT DOCUMENTS

| | | |
|---|---|---|
| 2004/0054996 A1 | 3/2004 | Srinivas et al. |
| 2004/0127223 A1 | 7/2004 | Li et al. |
| 2007/0189197 A1 | 8/2007 | Kwon et al. |
| 2008/0031216 A1 | 2/2008 | Lee et al. |
| 2009/0247174 A1* | 10/2009 | Zhang et al. ............... 455/450 |
| 2010/0061345 A1 | 3/2010 | Wengerter et al. |
| 2010/0074216 A1 | 3/2010 | Kwak et al. |
| 2010/0177715 A1 | 7/2010 | Ofuji et al. |
| 2011/0200003 A1 | 8/2011 | Pi et al. |

FOREIGN PATENT DOCUMENTS

| | | |
|---|---|---|
| KR | 10-2006-0104897 A | 10/2006 |
| KR | 10-0784323 B1 | 4/2007 |
| KR | 10-2008-0044979 A | 5/2008 |
| RU | 2181229 C1 | 4/2002 |
| RU | 2277762 C2 | 6/2006 |
| TW | 200635287 A | 10/2006 |
| WO | WO 2006/121262 A2 | 11/2006 |
| WO | WO 2006/135187 A2 | 12/2006 |
| WO | WO 2006/137708 A1 | 12/2006 |
| WO | WO 2007/094628 A1 | 8/2007 |
| WO | WO 2009/041770 A2 | 4/2009 |

OTHER PUBLICATIONS

Guocong Song; "Cross-Layer Resource Allocation and Scheduling in Wireless Multicarrier Networks"; A Thesis Presented to The Academic Faculty; School of Electricial and Computer Engineering Georgia Institute of Technology; pp. 1-153; Aug. 2005.

Panasonic et al., "Explanation of DVRB way forward," 3GPP TSG-RAN WG1 Meeting #52bis, R1-081623, Mar. 31-Apr. 4, 2008, p. 1-5.

QUALCOMM Europe, "Impact of Constrained Resource Signaling in PDCCH," 3GPP TSG-RAN WG1 #49, R1-072033, May 7-11, 2007, p. 1-11.

Motorola, "Definitions for DCI Format 1C", 3GPP TSG RAN1 #53, R1-082059, May 5-9, 2008, 6 pages.

* cited by examiner

FIG. 12

| S\L | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 | 18 | 19 |
| 2 | 20 | 21 | 22 | 23 | 24 | 25 | 26 | 27 | 28 | 29 | 30 | 31 | 32 | 33 | 34 | 35 | 36 | 37 | 38 | 39 |
| 3 | 40 | 41 | 42 | 43 | 44 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 | 96 | 97 | 98 | 99 |
| 6 | 100 | 101 | 102 | 103 | 104 | 105 | 106 | 107 | 108 | 109 | 110 | 111 | 112 | 113 | 114 | 115 | 116 | 117 | 118 | 119 |
| 7 | 120 | 121 | 122 | 123 | 124 | 125 | 126 | 127 | 128 | 129 | 130 | 131 | 132 | 133 | 134 | 135 | 136 | 137 | 138 | 139 |
| 8 | 140 | 141 | 142 | 143 | 144 | 145 | 146 | 147 | 148 | 149 | 150 | 151 | 152 | 153 | 154 | 155 | 156 | 157 | 158 | 159 |
| 9 | 160 | 161 | 162 | 163 | 164 | 165 | 166 | 167 | 168 | 169 | 170 | 171 | 172 | 173 | 174 | 175 | 176 | 177 | 178 | 179 |
| 10 | 180 | 181 | 182 | 183 | 184 | 185 | 186 | 187 | 188 | 189 | 190 | 191 | 192 | 193 | 194 | 195 | 196 | 197 | 198 | 199 |
| 11 | 200 | 201 | 202 | 203 | 204 | 205 | 206 | 207 | 208 | 209 | 210 | 211 | 212 | 213 | 214 | 215 | 216 | 217 | 218 | 219 |
| 12 | 199 | 198 | 197 | 196 | 195 | 194 | 193 | 192 | 191 | 190 | 189 | 188 | 187 | 186 | 185 | 184 | 183 | 182 | 181 | 180 |
| 13 | 179 | 178 | 177 | 176 | 175 | 174 | 173 | 172 | 171 | 170 | 169 | 168 | 167 | 166 | 165 | 164 | 163 | 162 | 161 | 160 |
| 14 | 159 | 158 | 157 | 156 | 155 | 154 | 153 | 152 | 151 | 150 | 149 | 148 | 147 | 146 | 145 | 144 | 143 | 142 | 141 | 140 |
| 15 | 139 | 138 | 137 | 136 | 135 | 134 | 133 | 132 | 131 | 130 | 129 | 128 | 127 | 126 | 125 | 124 | 123 | 122 | 121 | 120 |
| 16 | 119 | 118 | 117 | 116 | 115 | 114 | 113 | 112 | 111 | 110 | 109 | 108 | 107 | 106 | 105 | 104 | 103 | 102 | 101 | 100 |
| 17 | 99 | 98 | 97 | 96 | 95 | 94 | 93 | 92 | 91 | 90 | 89 | 88 | 87 | 86 | 85 | 84 | 83 | 82 | 81 | 80 |
| 18 | 79 | 78 | 77 | 76 | 75 | 74 | 73 | 72 | 71 | 70 | 69 | 68 | 67 | 66 | 65 | 64 | 63 | 62 | 61 | 60 |
| 19 | 59 | 58 | 57 | 56 | 55 | 54 | 53 | 52 | 51 | 50 | 49 | 48 | 47 | 46 | 45 | 44 | 43 | 42 | 41 | 40 |
| 20 | 39 | 38 | 37 | 36 | 35 | 34 | 33 | 32 | 31 | 30 | 29 | 28 | 27 | 26 | 25 | 24 | 23 | 22 | 21 | 20 |

FIG. 13

| S\L | 0 | 2 | 4 | 6 | 8 | 10 | 12 | 14 | 16 | 18 |
|---|---|---|---|---|---|---|---|---|---|---|
| 2 | 0 | 1 | 2 | 3 | 4 | 5 | 6 | 7 | 8 | 9 |
| 4 | 10 | 11 | 12 | 13 | 14 | 15 | 16 | 17 | 18 | 19 |
| 6 | 20 | 21 | 22 | 23 | 24 | 25 | 26 | 27 | 28 | 29 |
| 8 | 30 | 31 | 32 | 33 | 34 | 35 | 36 | 37 | 38 | 39 |
| 10 | 40 | 41 | 42 | 43 | 44 | 45 | 46 | 47 | 48 | 49 |
| 12 | 50 | 51 | 52 | 53 | 54 | 55 | 56 | 57 | 58 | 59 |
| 14 | 49 | 48 | 47 | 46 | 45 | 44 | 43 | 42 | 41 | 40 |
| 16 | 39 | 38 | 37 | 36 | 35 | 31 | 33 | 32 | 31 | 30 |
| 18 | 29 | 28 | 27 | 26 | 25 | 24 | 23 | 22 | 21 | 20 |
| 20 | 19 | 18 | 17 | 16 | 15 | 14 | 13 | 12 | 11 | 10 |

FIG. 14

| S\L | 0 | 2 | 4 | 6 | 8 | 10 | 12 | 11 | 16 | 18 | 20 | 22 | 24 | 26 | 28 | 30 | 32 | 34 | 36 | 38 |
|---|---|---|---|---|---|---|---|---|---|---|---|---|---|---|---|---|---|---|---|---|
| 2 | 0 | 1 | 2 | 3 | 4 | 5 | 6 | 7 | 8 | 9 | 10 | 11 | 12 | 13 | 14 | 15 | 16 | 17 | 18 | 19 |
| 4 | 20 | 21 | 22 | 23 | 24 | 25 | 26 | 27 | 28 | 29 | 30 | 31 | 32 | 33 | 34 | 35 | 36 | 37 | 38 | 39 |
| 6 | 40 | 41 | 42 | 43 | 44 | 45 | 46 | 47 | 48 | 49 | 50 | 51 | 52 | 53 | 54 | 55 | 56 | 57 | 58 | 59 |
| 8 | 60 | 61 | 62 | 63 | 64 | 65 | 66 | 67 | 68 | 69 | 70 | 71 | 72 | 73 | 74 | 75 | 76 | 77 | 78 | 79 |
| 10 | 80 | 81 | 82 | 83 | 84 | 85 | 86 | 87 | 88 | 89 | 90 | 91 | 92 | 93 | 94 | 95 | 96 | 97 | 98 | 99 |
| 12 | 100 | 101 | 102 | 103 | 104 | 105 | 106 | 107 | 108 | 109 | 110 | 111 | 112 | 113 | 114 | 115 | 116 | 117 | 118 | 119 |
| 14 | 120 | 121 | 122 | 123 | 124 | 125 | 126 | 127 | 128 | 129 | 130 | 131 | 132 | 133 | 134 | 135 | 135 | 137 | 138 | 139 |
| 16 | 140 | 141 | 142 | 143 | 144 | 145 | 146 | 147 | 148 | 149 | 150 | 151 | 152 | 153 | 154 | 155 | 156 | 157 | 158 | 159 |
| 18 | 160 | 161 | 162 | 163 | 164 | 165 | 166 | 167 | 168 | 169 | 170 | 171 | 172 | 173 | 174 | 175 | 176 | 177 | 178 | 179 |
| 20 | 180 | 181 | 182 | 183 | 184 | 185 | 186 | 187 | 188 | 189 | 190 | 191 | 192 | 193 | 194 | 195 | 196 | 197 | 198 | 199 |
| 22 | 200 | 201 | 202 | 203 | 204 | 205 | 206 | 207 | 208 | 209 | 210 | 211 | 212 | 213 | 214 | 215 | 216 | 217 | 218 | 219 |
| 24 | 199 | 198 | 197 | 196 | 195 | 194 | 193 | 192 | 191 | 190 | 189 | 188 | 187 | 186 | 185 | 184 | 183 | 182 | 181 | 180 |
| 26 | 179 | 178 | 177 | 176 | 175 | 174 | 173 | 172 | 171 | 170 | 169 | 168 | 167 | 166 | 165 | 164 | 163 | 162 | 161 | 160 |
| 28 | 159 | 158 | 157 | 156 | 155 | 154 | 153 | 152 | 151 | 150 | 149 | 148 | 147 | 146 | 145 | 144 | 143 | 142 | 141 | 140 |
| 30 | 139 | 138 | 137 | 136 | 135 | 134 | 133 | 132 | 131 | 130 | 129 | 128 | 127 | 126 | 125 | 124 | 123 | 122 | 121 | 120 |
| 32 | 119 | 118 | 117 | 116 | 115 | 114 | 113 | 112 | 111 | 110 | 109 | 108 | 107 | 106 | 105 | 104 | 103 | 102 | 101 | 100 |
| 34 | 99 | 98 | 97 | 96 | 95 | 94 | 93 | 92 | 91 | 90 | 89 | 88 | 87 | 86 | 85 | 84 | 83 | 82 | 81 | 80 |
| 36 | 79 | 78 | 77 | 76 | 75 | 74 | 73 | 72 | 71 | 70 | 69 | 68 | 67 | 66 | 65 | 64 | 63 | 62 | 61 | 60 |
| 38 | 59 | 58 | 57 | 56 | 55 | 54 | 53 | 52 | 51 | 50 | 49 | 48 | 47 | 46 | 45 | 44 | 43 | 42 | 41 | 40 |
| 40 | 39 | 38 | 37 | 36 | 35 | 34 | 33 | 32 | 31 | 30 | 29 | 28 | 27 | 26 | 25 | 24 | 23 | 22 | 21 | 20 |

FIG. 15

| L\S | 0 | 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 | 50 | 52 | 54 | 56 | 58 | 60 | 62 | 64 |
|---|---|---|---|---|---|---|---|---|---|---|---|---|---|---|---|---|---|---|---|---|---|---|---|---|---|---|---|---|---|---|---|---|---|
| 2 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 4 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 |
| 6 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 |
| 8 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 | 130 | 131 | 132 | 133 | 134 |
| 10 | 101 | 100 | 99 | 98 | 97 | 96 | 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 |
| 12 | 67 | 66 | 65 | 64 | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 |
| 14 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |

FIG. 16

| S\L | 0 | 2 | 4 | 6 | 8 | 10 | 12 | 14 | 16 | 18 |
|---|---|---|---|---|---|---|---|---|---|---|
| 4 | 0 | 1 | 2 | 3 | 4 | 5 | 6 | 7 | 8 | 9 |
| 8 | 9 | 10 | 11 | 12 | 13 | 14 | 15 | 16 | 17 | 18 |
| 12 | 18 | 19 | 20 | 21 | 22 | 23 | 24 | 25 | 26 | 27 |
| 16 | 26 | 25 | 24 | 23 | 22 | 21 | 20 | 19 | 18 | 17 |
| 20 | 17 | 16 | 15 | 14 | 13 | 12 | 11 | 10 | 9 | 8 |

FIG. 17

| S\L | 0 | 4 | 8 | 12 | 16 |
|---|---|---|---|---|---|
| 2 | 0 | 1 | 2 | 3 | 4 |
| 4 | 5 | 6 | 7 | 8 | 9 |
| 6 | 10 | 11 | 12 | 13 | 14 |
| 8 | 15 | 16 | 17 | 18 | 19 |
| 10 | 20 | 21 | 22 | 23 | 24 |
| 12 | 25 | 26 | 27 | 28 | 29 |
| 14 | 29 | 28 | 27 | 26 | 25 |
| 16 | 24 | 23 | 22 | 21 | 20 |
| 18 | 19 | 18 | 17 | 16 | 15 |
| 20 | 14 | 13 | 12 | 11 | 10 |

FIG. 18

| L\S | 1 | 3 | 5 | 7 | 9 | 11 | 13 | 15 | 17 | 19 |
|---|---|---|---|---|---|---|---|---|---|---|
| 4 | 0 | 1 | 2 | 3 | 4 | 5 | 6 | 7 | 8 | 9 |
| 6 | 8 | 9 | 10 | 11 | 12 | 13 | 14 | 15 | 16 | 17 |
| 8 | 16 | 17 | 18 | 19 | 20 | 21 | 22 | 23 | 24 | 25 |
| 10 | 24 | 25 | 26 | 27 | 28 | 29 | 30 | 31 | 32 | 33 |
| 12 | 32 | 33 | 34 | 35 | 37 | 38 | 39 | 40 | 41 |
| 14 | 31 | 30 | 29 | 28 | 27 | 26 | 25 | 24 | 23 | 22 |
| 16 | 23 | 22 | 21 | 20 | 19 | 18 | 17 | 16 | 15 | 14 |
| 18 | 15 | 14 | 13 | 12 | 11 | 10 | 9 | 8 | 7 | 6 |
| 20 | 7 | 6 | 5 | 4 | 3 | 2 | 1 | 0 | -1 | -2 |

FIG. 19

| L\S | - | 5 | 9 | 13 | 17 | 21 | 25 | 29 |
|---|---|---|---|---|---|---|---|---|
| 4 | 0 | 1 | 2 | 3 | 4 | 5 | 6 | 7 |
| 6 | 7 | 8 | 9 | 10 | 11 | 12 | 13 | 14 |
| 8 | 14 | 15 | 16 | 17 | 18 | 19 | 20 | 21 |
| 10 | 21 | 22 | 23 | 24 | 25 | 26 | 27 | 28 |
| 12 | 28 | 29 | 30 | 31 | 32 | 33 | 34 | 35 |
| 14 | 35 | 36 | 37 | 38 | 39 | 40 | 41 | 42 |
| 15 | 42 | 43 | 44 | 45 | 46 | 47 | 48 | 49 |
| 18 | 48 | 47 | 46 | 45 | 44 | 43 | 42 | 41 |
| 20 | 41 | 40 | 39 | 38 | 37 | 36 | 35 | 34 |
| 22 | 34 | 33 | 32 | 31 | 30 | 29 | 28 | 27 |
| 24 | 27 | 26 | 25 | 24 | 23 | 22 | 21 | 20 |
| 25 | 20 | 19 | 18 | 17 | 16 | 15 | 14 | 13 |
| 28 | 13 | 12 | 11 | 10 | 9 | 8 | 7 | 6 |
| 30 | 6 | 5 | 4 | 3 | 2 | 1 | 0 | -1 |

METHOD FOR SIGNALING OF RESOURCE ALLOCATION TO ADJUST GRANULARITY IN CELLULAR MULTI-CARRIER SYSTEM

CROSS-REFERENCE TO RELATED APPLICATIONS

This application is a continuation of co-pending U.S. application Ser. No. 12/987,911, filed on Jan. 10, 2011, which is a continuation of U.S. application Ser. No. 12/421,877 (now U.S. Pat. No. 7,885,221), filed on Apr. 10, 2009, which claims the benefit of U.S. Provisional Application No. 61/075,010, filed on Jun. 24, 2008, and U.S. Provisional Application No. 61/074,131, filed on Jun. 19, 2008, and Korean Patent Application No. 10-2008-0136669, filed on Dec. 30, 2008, all of which are hereby incorporated by reference as if fully set forth herein.

BACKGROUND OF THE INVENTION

1. Field of the Invention

The present invention relates to a broadband wireless mobile communication system, and more particularly, to radio resource scheduling for uplink/downlink packet data transmission in a cellular orthogonal frequency division multiplexing (OFDM) wireless packet communication system.

2. Discussion of the Related Art

In a cellular orthogonal frequency division multiplex (OFDM) wireless packet communication system, uplink/downlink data packet transmission is made on a subframe basis and one subframe is defined by a certain time interval including a plurality of OFDM symbols.

The 3$^{rd}$ Generation Partnership Project (3GPP) supports a type 1 radio frame structure applicable to frequency division duplex (FDD), and a type 2 radio frame structure applicable to time division duplex (TDD). The structure of a type 1 radio frame is shown in FIG. 1. The type 1 radio frame includes ten subframes, each of which consists of two slots. The structure of a type 2 radio frame is shown in FIG. 2. The type 2 radio frame includes two half-frames, each of which is made up of five subframes, a downlink piloting time slot (DwPTS), a gap period (GP), and an uplink piloting time slot (UpPTS), in which one subframe consists of two slots. That is, one subframe is composed of two slots irrespective of the radio frame type.

A signal transmitted from each slot can be described by a resource grid including $N_{RB}^{DL}N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. The structure of this resource grid is shown in FIG. 3.

RBs are used to describe a mapping relationship between certain physical channels and resource elements. The RBs can be divided into physical resource blocks (PRBs) and virtual resource blocks (VRBs). A mapping relationship between the VRBs and the PRBs can be described on a subframe basis. In more detail, it can be described in units of a slot constituting one subframe. Also, the mapping relationship between the VRBs and the PRBs can be described using a mapping relationship between indexes of the VRBs and indexes of PRBs. A detailed description of this will be further given in embodiments of the present invention.

A PRB is defined by $N_{symb}^{DL}$ consecutive OFDM symbols in a time domain and $N_{SC}^{RB}$ consecutive subcarriers in a frequency domain. One PRB is therefore composed of $N_{symb}^{DL}N_{SC}^{RB}$ resource elements. The PRBs are assigned numbers from 0 to $N_{RB}^{DL}-1$ in the frequency domain.

A VRB can have the same size as that of the PRB. There are two types of VRBs defined, the first one being a localized type and the second one being a distributed type. For each VRB type, a pair of VRBs have a single VRB index (may hereinafter be referred to as a 'VRB number') and are allocated over two slots of one subframe. In other words, $N_{RB}^{DL}$ VRBs belonging to a first one of two slots constituting one subframe are each assigned any one index of 0 to $NR_{RB}^{DL}-1$, and $NR_{RB}^{DL}$ VRBs belonging to a second one of the two slots are likewise each assigned any one index of 0 to $N_{RB}^{DL}-1$.

The index of a VRB corresponding to a specific virtual frequency band of the first slot has the same value as that of the index of a VRB corresponding to the specific virtual frequency band of the second slot. That is, assuming that a VRB corresponding to an ith virtual frequency band of the first slot is denoted by VRB1(i), a VRB corresponding to a jth virtual frequency band of the second slot is denoted by VRB2(j) and index numbers of the VRB1(i) and VRB2(j) are denoted by index(VRB1(i)) and index(VRB2(j)), respectively, a relationship of index(VRB1(k))=index(VRB2(k)) is established (see FIG. 4A).

Likewise, the index of a PRB corresponding to a specific frequency band of the first slot has the same value as that of the index of a PRB corresponding to the specific frequency band of the second slot. That is, assuming that a PRB corresponding to an ith frequency band of the first slot is denoted by PRB1(i), a PRB corresponding to a jth frequency band of the second slot is denoted by PRB2(j) and index numbers of the PRB1(i) and PRB2(j) are denoted by index(PRB1(i)) and index(PRB2(j)), respectively, a relationship of index (PRB1(k))=index(PRB2(k)) is established (see FIG. 4B).

Some of the aforementioned VRBs are allocated as the localized type and the others are allocated as the distributed type. Hereinafter, the VRBs allocated as the localized type will be referred to as 'localized virtual resource blocks (LVRBs)' and the VRBs allocated as the distributed type will be referred to as 'distributed virtual resource blocks (DVRBs)'.

The localized VRBs (LVRBs) are directly mapped to PRBs and the indexes of the LVRBs correspond to the indexes of the PRBs. Also, LVRBs of an index i correspond to PRBs of the index i. That is, an LVRB1 having the index i corresponds to a PRB1 having the index i, and an LVRB2 having the index i corresponds to a PRB2 having the index i (see FIG. 5). In this case, it is assumed that the VRBs of FIG. 5 are all allocated as LVRBs.

The distributed VRBs (DVRBs) may not be directly mapped to PRBs. That is, the indexes of the DVRBs can be mapped to the PRBs after being subjected to a series of processes.

First, the order of a sequence of consecutive indexes of the DVRBs can be reversed by a block interleaver. Here, the sequence of consecutive indexes means that the index number is sequentially incremented by one beginning with 0. A sequence of indexes outputted from the block interleaver is sequentially mapped to a sequence of consecutive indexes of PRB1s (see FIG. 6). It is assumed that the VRBs of FIG. 6 are all allocated as DVRBs. Thereafter, the sequence of indexes outputted from the block interleaver is cyclically shifted by a predetermined number and the cyclically shifted index sequence is sequentially mapped to a sequence of consecutive indexes of PRB2s (see FIG. 7). It is assumed that the VRBs of FIG. 7 are all allocated as DVRBs. In this manner, PRB indexes and DVRB indexes can be mapped over two slots.

On the other hand, in the above processes, a sequence of consecutive indexes of the DVRBs, not passed through the interleaver, may be sequentially mapped to the sequence of consecutive indexes of the PRB1s. Also, the sequence of consecutive indexes of the DVRBs, not passed through the interleaver, may be cyclically shifted by the predetermined number and the cyclically shifted index sequence may be sequentially mapped to the sequence of consecutive indexes of the PRB2s.

According to the above-mentioned processes of mapping DVRBs to PRBs, a PRB1(i) and a PRB2(i) having the same index i can be mapped to a DVRB1(m) having an index 'm' and a DVRB2(n) having an index 'n', respectively. For example, referring to FIGS. 6 and 7, a PRB1(1) and a PRB2(1) are mapped to a DVRB1(6) and a DVRB2(9) having different indexes, respectively. A frequency diversity effect can be obtained based on the DVRB mapping scheme.

A variety of methods for allocating such VRBs may be used, for example, a bitmap method and a compact method. According to this bitmap method, resources can be freely allocated all over the system band, and non-consecutive RBs can also be allocated. However, the above-mentioned bitmap method has a disadvantage in that it unavoidably increases the number of bits requested for allocation of RBs as the number of the RBs increases. According to the compact method, only one set of consecutive RBs can be assigned all over the system band. In order to represent the consecutive RBs, a resource indication value (RIV) may be defined. This RIV may represent a combination of a start point (S) of the series of allocated RBs among all RBs and a length (L) of the series of allocated RBs. According to the number of generable combinations of the start point (S) and the length (L), the number of bits representing a certain RIV for indicating a specific combination is decided by the above compact method. Assuming that the number of bits representing this RIV can be reduced, the remaining bits may be used to transmit other information.

SUMMARY OF THE INVENTION

An object of the present invention devised to solve the problem lies on a method for reducing an amount of control information representing a range of allocated resources in a resource allocation scheme based on the compact method.

The object of the present invention can be achieved by providing, in a wireless mobile communication system supporting a compact scheduling scheme, which supports a downlink control information format and allocates one set of consecutive virtual resource blocks (VRBs) to one codeword, a method for detecting a resource indication value (RIV) indicating a start index (S) and length (L) of the one set of consecutive virtual resource blocks (VRBs) allocated by the compact scheduling scheme, the method including: receiving downlink control information including resource block allocation information; and, if the downlink control information format of the received downlink block allocation information is used for the compact scheduling scheme, detecting the resource individual value (RIV) from the resource block allocation information, wherein the start point (S) is any one of elements of a first set $\{s: s=P+mT<N_{RB}\}$ (where P is a predetermined integer of 0 or higher, T is a predetermined natural number, m is an integer of 0 or higher, and $N_{RB}$ is the number of resource blocks (RBs) available in the wireless mobile communication system), and the length (L) is any one of elements of a second set $\{l: 1=K+nG \leq N_{RB}\}$ (where K is a predetermined integer of 0 or higher, G is a predetermined natural number, and n is a natural number).

$N_{RB}$ may be limited to $N_{VRB}$. $N_{VRB}$ may be the number of virtual resource blocks (VRBs) available in the wireless mobile communication system.

T may be equal to G.

P may be zero (P=0), and K may be zero (K=0).

$N_{RB}$ may be denoted by $N_{RB}=\lfloor N_{VRB}/G \rfloor \cdot G$, where $N_{VRB}$ is the number of virtual resource blocks (VRBs) available in the wireless mobile communication system.

The l value may be equal to or less than a predetermined value $L^{limit}$, where $L^{limit}$ may be equal to or higher than K and may be lower than the $N_{RB}$ value.

In another aspect of the present invention, there is provided, in a wireless mobile communication system supporting the compact scheduling scheme, a method for detecting a resource indication value (RIV) indicating a start index (S) and length (L) of one set of consecutive virtual resource blocks (VRBs) allocated by the compact scheduling scheme, the method including: receiving downlink control information including resource block allocation information; and, if a downlink control information format of the received downlink control information indicates the use of the compact scheduling scheme, detecting the resource indication value (RIV) from the resource block allocation information, wherein, if $Y-1 \leq \lfloor X/2 \rfloor$ is given, the resource indication value (RIV) is denoted by RIV=X(Y−1)+Z, or else the resource indication value (RIV) is denoted by RIV=X(X−Y+1)+(X−1−Z), where X is denoted by $X=\lfloor N_{RB}/G \rfloor$, Y is denoted by Y=L/G, and Z is denoted by Z=S/G, in which, L is the length of the one set of the consecutive virtual resource blocks (VRBs), S is the start index of the one set of the consecutive virtual resource blocks (VRBs), $N_{VRB}$ is the number of virtual resource blocks (RBs) available in the wireless mobile communication system, each of L and S is a multiple of G, and G is a predetermined natural number.

$N_{RB}$ may be denoted by $N_{RB}=\lfloor N_{VRB}/G \rfloor \cdot G$, where $N_{VRB}$ is the number of virtual resource blocks (VRBs) available in the wireless mobile communication system.

$N_{bit\_required}$ of a bit field used for transmitting the resource indication value (RIV) may be denoted by $N_{bit\_required}= \lceil \log_2(RIV_{max}+1) \rceil$, where $RIV_{max}$ is denoted by $RIV_{max}=\lfloor N_{RB}/G \rfloor \cdot (\lfloor N_{RB}/G \rfloor+1)/2-1$.

The present invention provides a radio resource scheduling scheme, a structure of scheduling information, and a transmission scheme, such that it can more efficiently implement a resource allocation scheme for common signaling.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 12 is a view illustrating an example of RIVs when $N_{RB}=20$.

FIGS. 13 to 19 are views illustrating RIVs of generable combinations of S and L values according to one embodiment of the present invention.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering around specific terms, but the present invention is not limited thereto and any other terms may be used to represent the same meanings Also, wherever possible, the same reference numbers will be used throughout the drawings to refer to the same or like parts.

Hereinafter, terms used in the detailed description of this application are defined as follows.

A 'resource element (RE)' represents a smallest frequency-time unit in which data or a modulated symbol of a control channel is mapped. Provided that a signal is transmitted in one OFDM symbol over M subcarriers and N OFDM symbols are transmitted in one subframe, M×N REs are present in one subframe.

A 'physical resource block (PRB)' represents a unit frequency-time resource for data transmission. In general, one PRB includes a plurality of consecutive REs in a frequency-time domain, and a plurality of PRBs are defined in one subframe.

A 'virtual resource block (VRB)' represents a virtual unit resource for data transmission. In general, the number of REs included in one VRB is equal to that of REs included in one PRB, and, when data is transmitted, one VRB can be mapped to one PRB or some areas of a plurality of PRBs.

A 'localized virtual resource block (LVRB)' is one type of the VRB. One LVRB is mapped to one PRB, and PRBs to which different LVRBs are mapped are not duplicated. An LVRB may be interpreted just as a PRB.

A 'distributed virtual resource block (DVRB)' is another type of the VRB. One DVRB is mapped to some REs in a plurality of PRBs, and REs to which different DVRBs are mapped are not duplicated.

Figure 8:
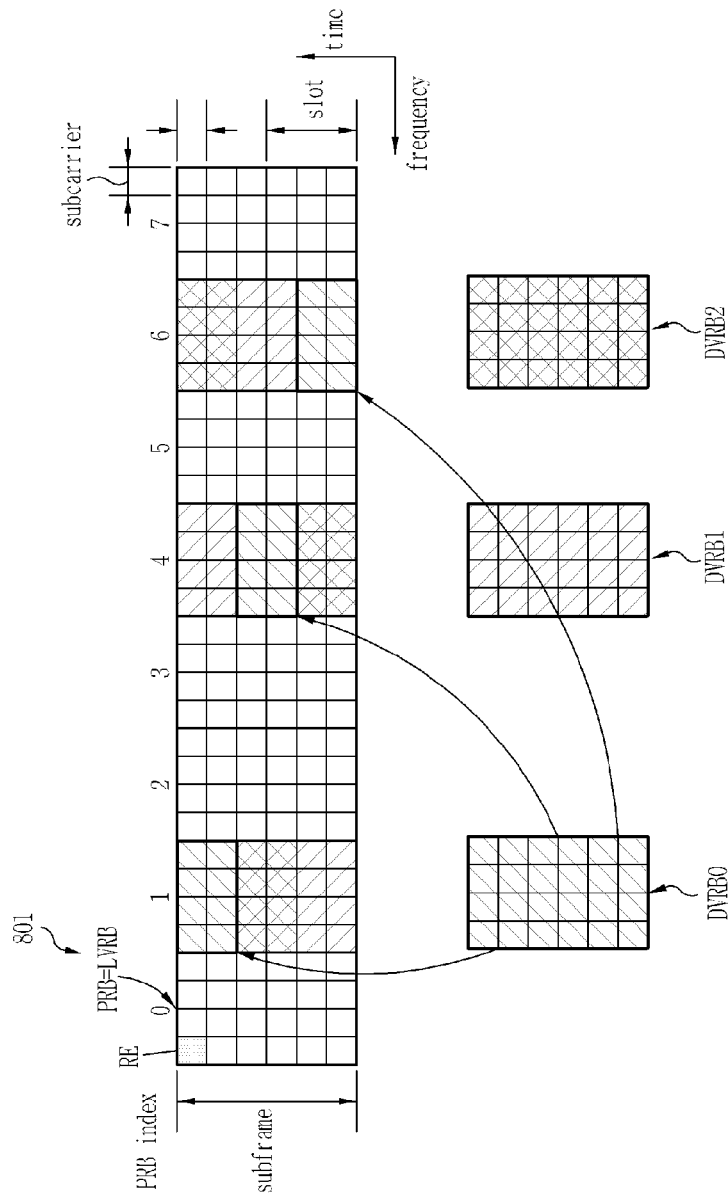
FIG. 8 is a view illustrating an example of a method for mapping DVRBs and LVRBs to PRBs.

'$N_D$'='$N_d$' represents the number of PRBs to which one DVRB is mapped. FIG. 8 illustrates an example of a method for mapping DVRBs and LVRBs to PRBs. In FIG. 8, $N_D=3$. As can be seen from FIG. 8, an arbitrary DVRB can be divided into three parts and the divided parts can be mapped to different PRBs, respectively. At this time, the remaining part of each PRB, not mapped by the arbitrary DVRB, is mapped to a divided part of another DVRB.

'$N_{PRB}$' represents the number of PRBs in a system. '$N_{LVRB}$' represents the number of LVRBs available in the system.

'$N_{LVRB}$' represents the number of LVRBs available in the system.

'$N_{DVRB}$' represents the number of DVRBs available in the system.

'$N_{LVRB\_UE}$' represents the maximum number of LVRBs allocable to one user equipment (UE).

'$N_{DVRB\_UE}$' represents the maximum number of DVRBs allocable to one UE.

'$N_{subset}$' represents the number of subsets.

Here, the "number of RBs" means the number of RBs divided on a frequency axis. That is, even in the case where RBs can be divided by slots constituting a subframe, the "number of RBs" means the number of RBs divided on the frequency axis of the same slot.

FIG. 8 shows an example of definitions of LVRBs and DVRBs.

As can be seen from FIG. 8, each RE of one LVRB is one-to-one mapped to each RE of one PRB. For example, one LVRB is mapped to a PRB0 (801). In contrast, one DVRB is divided into three parts and the divided parts are mapped to different PRBs, respectively. For example, a DVRB0 is divided into three parts and the divided parts are mapped to a PRB1, PRB4 and PRB6, respectively. Likewise, a DVRB1 and a DVRB2 are each divided into three parts and the divided parts are mapped to the remaining resources of the PRB1, PRB4 and PRB6. Although each DVRB is divided into three parts in this example, the present invention is not limited thereto. For example, each DVRB may be divided into two parts.

Downlink data transmission from a base station to a specific terminal or uplink data transmission from the specific terminal to the base station is made through one or more VRBs in one subframe. When the base station transmits data to the specific terminal, it has to notify the terminal of which one of the VRBs through which the data will be transmitted. Also, in order to enable the specific terminal to transmit data, the base station has to notify the terminal of which one of the VRBs through which the data can be transmitted.

Data transmission schemes can be broadly classified into a frequency diversity scheduling (FDS) scheme and a frequency selective scheduling (FSS) scheme. The FDS scheme is a scheme that obtains a reception performance gain through frequency diversity, and the FSS scheme is a scheme that obtains a reception performance gain through frequency selective scheduling.

In the FDS scheme, a transmission stage transmits one data packet over subcarriers widely distributed in a system frequency domain so that symbols in the data packet can experience various radio channel fadings. Therefore, an improvement in reception performance is obtained by preventing the entire data packet from being subject to unfavorable fading. In contrast, in the FSS scheme, an improvement in reception performance is obtained by transmitting the data packet over one or more consecutive frequency areas in the system frequency domain which are in a favorable fading state. In a cellular OFDM wireless packet communication system, a plurality of terminals are present in one cell. At this time, because the radio channel conditions of the respective terminals have different characteristics, it is necessary to perform data transmission of the FDS scheme with respect to a certain terminal and data transmission of the FSS scheme with respect to a different terminal even within one subframe. As a result, a detailed FDS transmission scheme and a detailed FSS transmission scheme must be designed such that the two schemes can be efficiently multiplexed within one subframe. On the other hand, in the FSS scheme, a gain can be obtained by selectively using a band favorable to a UE among all available bands. In contrast, in the FDS scheme, a comparison is not made as to whether a specific band is good or bad, and, as long as a frequency interval capable of adequately obtaining a diversity is maintained, there is no need to select and transmit a specific frequency band. Accordingly, it is advantageous to an improvement in entire system performance to perform the frequency selective scheduling of the FSS scheme preferentially when scheduling.

In the FSS scheme, because data is transmitted using subcarriers consecutively contiguous in the frequency domain, it is preferable that the data is transmitted using LVRBs. At this time, provided that $N_{PRB}$ PRBs are present in one subframe and a maximum of $N_{LVRB}$ LVRBs are available within the system, the base station can transmit bitmap information of $N_{LVRB}$ bits to each terminal to notify the terminal of which one of the LVRBs through which downlink data will be transmitted or which one of the LVRBs through which uplink data can be transmitted. That is, each bit of the $N_{LVRB}$-bit bitmap information, which is transmitted to each terminal as scheduling information, indicates whether data will or can be transmitted through an LVRB corresponding to this bit, among the $N_{LVRB}$ LVRBs. This scheme is disadvantageous in that, when the number $N_{LVRB}$ becomes larger, the number of bits to be transmitted to each terminal becomes larger in proportion thereto.

On the other hand, a physical downlink control channel DCI (PDCCH) transferred to a user equipment (UE) may have a plurality of formats. A resource allocation field transferred over the PDCCH may have different structures according to DCI formats. Thus, the user equipment (UE) may interpret the resource allocation field according to a format of the received DCI.

The resource allocation field may have two parts, i.e., resource block allocation information and a resource allocation header field. A plurality of resource allocation types may be defined. For example, according to a first-type resource allocation, the resource block allocation information may have a bitmap indicating one set of consecutive physical resource blocks (PRBs). In this case, one bit may be allocated to one resource block group (RBG). According to a second-type resource allocation, resource block allocation information may have a bitmap indicating subsets or RBs allocated to the UE. According to a third-type resource allocation, resource block allocation information may have a bitmap indicating consecutively-allocated VRBs. At this time, the resource allocation field may include a resource indication value (RIV) indicating a start resource block and the length of consecutively-allocated resource blocks (RBs). Examples of the above-mentioned resource allocation types have been disclosed in the 3GPP TS 36.213 document.

For example, a DCI format 1A prescribed in the 3GPP TS 36.213 may be used for compact scheduling of one physical downlink shared channel (PDSCH) codeword. This compact scheduling is a scheduling scheme for allocating one set of consecutive VRBs to a user equipment (UE), and corresponds to the above third-type resource allocation. Hereinafter, the above-mentioned compact scheduling in the present invention may be referred to as a compact scheme.

As described above, provided that a terminal (i.e., the UE) may be assigned only one set of contiguous RBs, information of the assigned RBs may be represented by the compact scheme denoted by both a start point of RBs and the number of the RBs.

Figure 9:
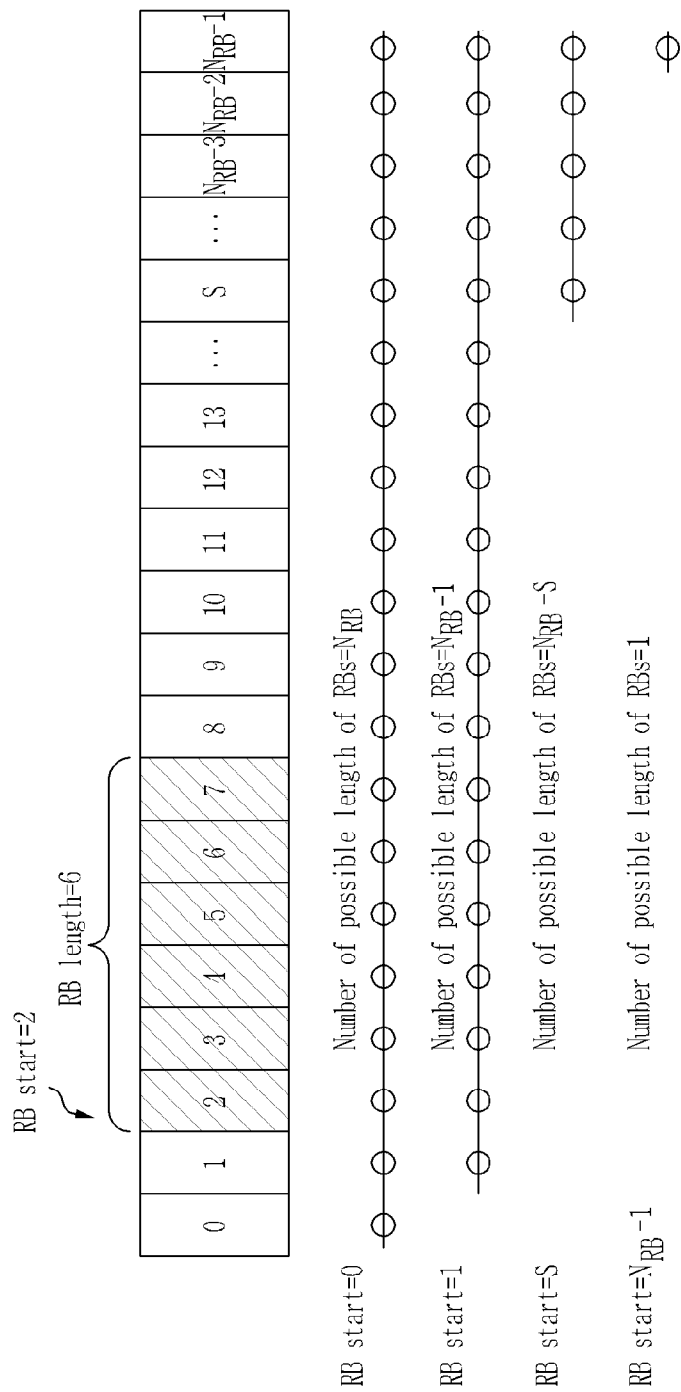
FIG. 9 is a view illustrating an example of a method for allocating resource blocks by a compact scheme.

FIG. 9 is a view illustrating an example of a method for allocating resource blocks by a compact scheme. If the number of available RBs is denoted by $N_{RB}=N_{VRB}$, the length of available RBs is different depending on respective start points as shown in FIG. 9, such that the number of combinations for RB allocation is $N_{LVRB}(N_{LVRB}+1)/2$ in the end. Accordingly, the number of bits required for the combinations is 'ceiling $(\log 2(N_{LVRB}(N_{LVRB}+1)/2))$'. Here, ceiling(x) means rounding "x" up to a nearest integer. This method is advantageous over the bitmap scheme in that the number of bits does not so significantly increase with the increase in the number $N_{LVRB}$.

On the other hand, for a method for notifying a user equipment (UE) of DVRB allocation, it is necessary to previously promise the positions of respective divided parts of DVRBs distributively transmitted for a diversity gain. Alternatively, additional information may be required to directly notify the positions. Preferably, provided that the number of bits for signaling for the DVRBs is set to be equal to the number of bits in LVRB transmission of the above-stated compact scheme, it is possible to simplify a signaling bit format in a downlink. As a result, there are advantages that the same channel coding can be used, etc.

Here, in the case where one UE is allocated a plurality of DVRBs, this UE is notified of a DVRB index of a start point of the DVRBs, a length (=the number of the allocated DVRBs), and a relative position difference between divided parts of each DVRB (e.g., a gap between the divided parts).

Figure 10:
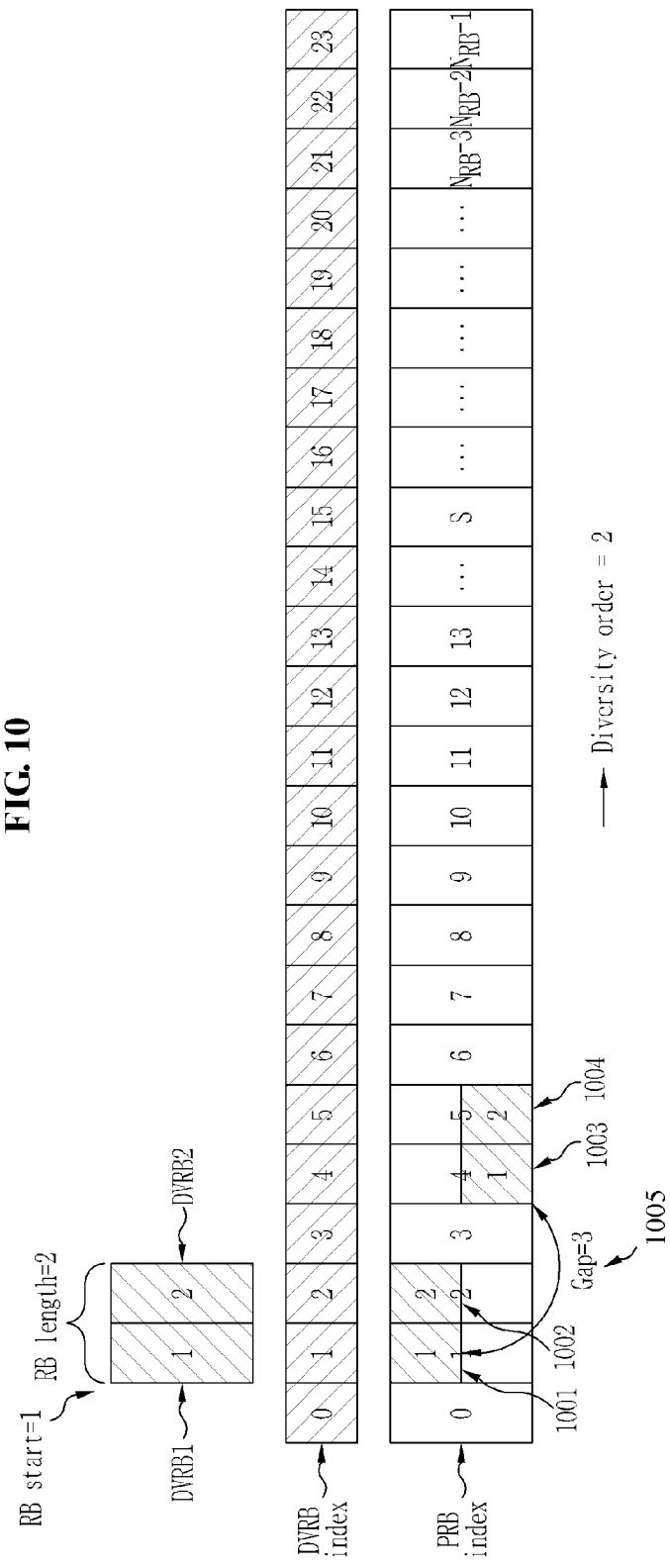
FIG. 10 is a view illustrating an example of a method for mapping two DVRBs having consecutive indexes to a plurality of contiguous PRBs.

FIG. 10 illustrates an example of a method for mapping two DVRBs having consecutive indexes to a plurality of contiguous PRBs.

As shown in FIG. 10, in the case where a plurality of DVRBs having consecutive indexes are mapped to a plurality of contiguous PRBs, first divided parts 1001 and 1002 and second divided parts 1003 and 1004 are spaced part from each other by a gap 1005, while divided parts belonging to each of the upper divided parts and lower divided parts are contiguous to each other, so that the diversity order becomes 2.

Figure 11:
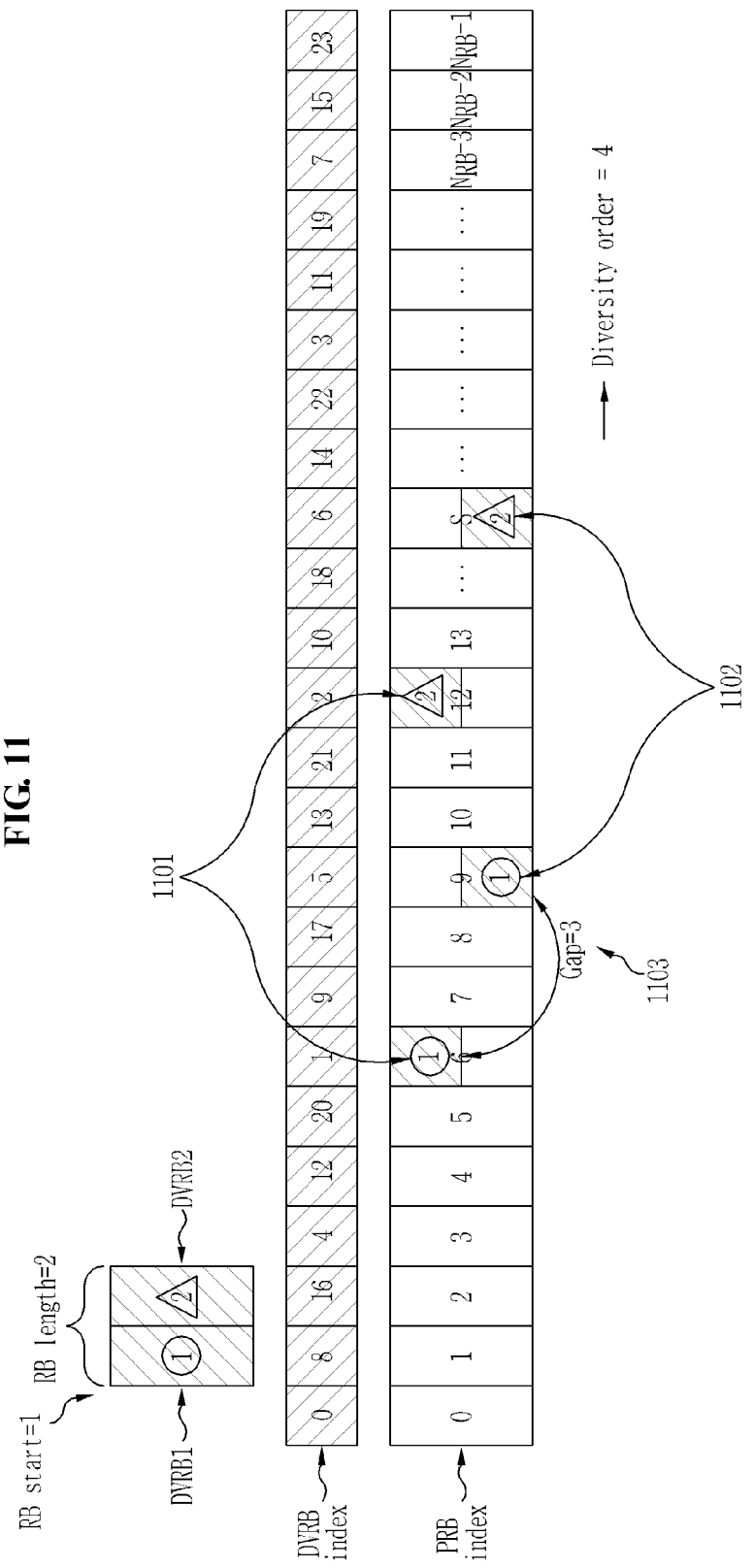
FIG. 11 is a view illustrating an example of a method for mapping two DVRBs having consecutive indexes to a plurality of spaced PRBs.

FIG. 11 illustrates an example of a method for mapping two DVRBs having consecutive indexes to a plurality of spaced PRBs.

Figure 1:
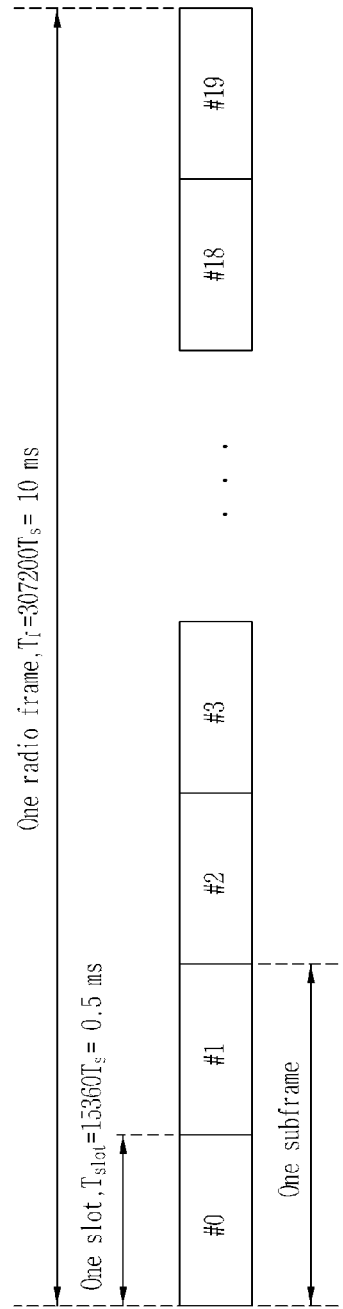
FIG. 1 is a view showing an example of a radio frame structure applicable to FDD.
Figure 2:
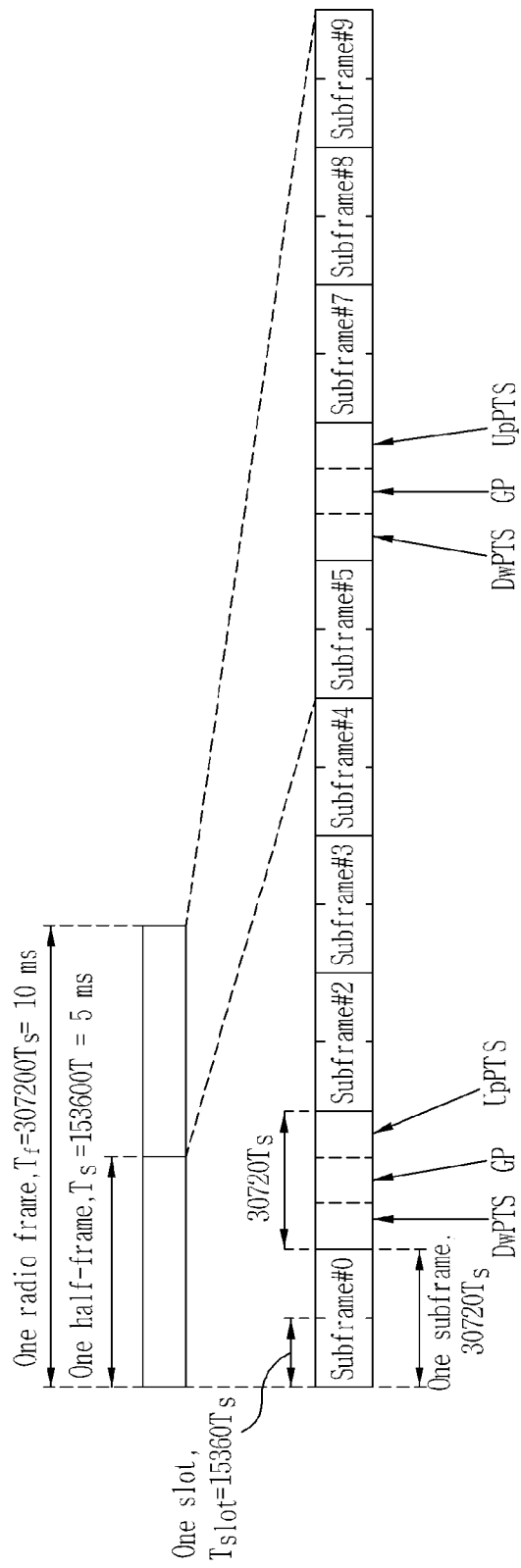
FIG. 2 is a view showing an example of a radio frame structure applicable to TDD.
Figure 3:
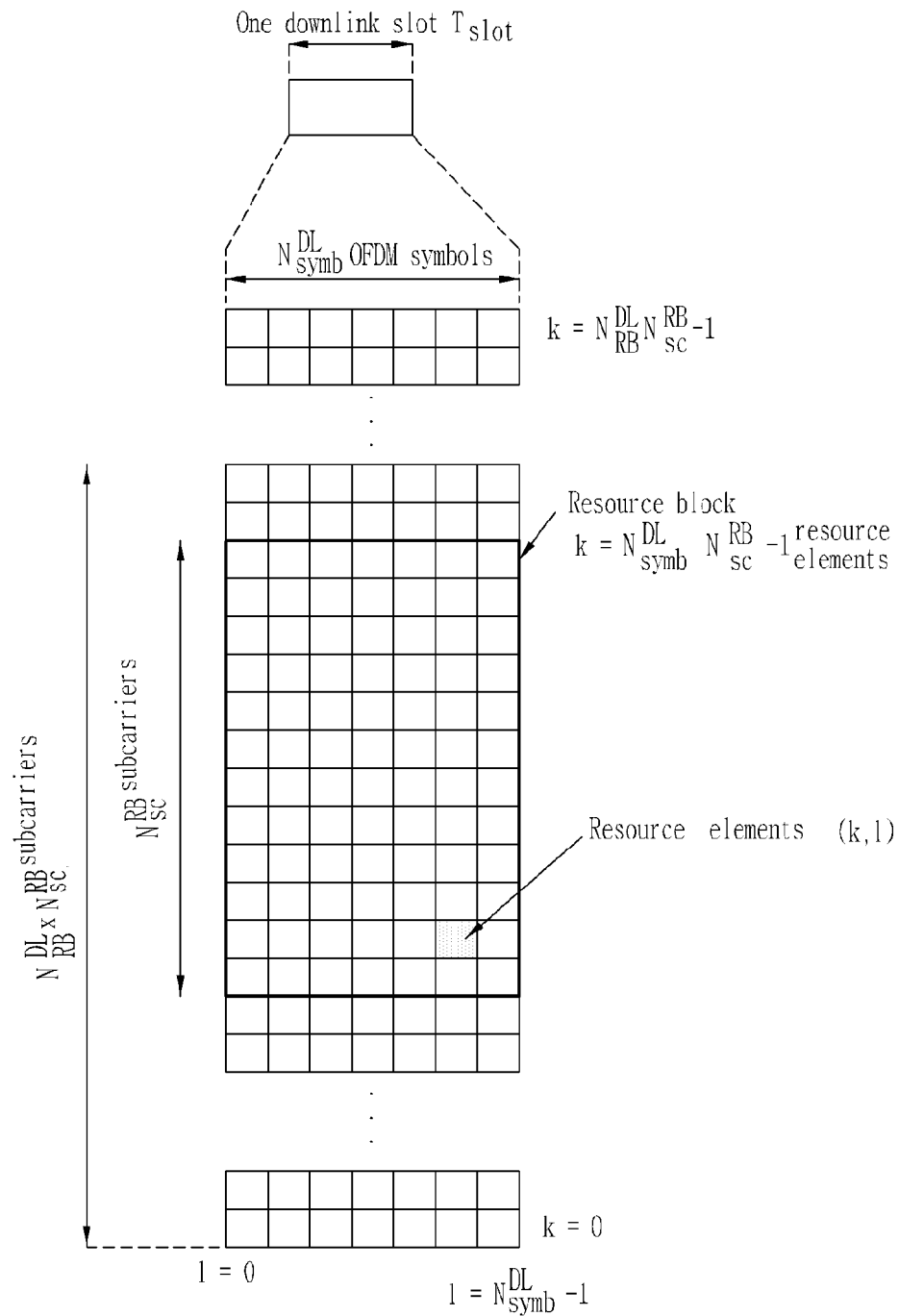
FIG. 3 is a view showing an example of a resource grid structure constituting a 3GPP transmission slot.
Figure 4:
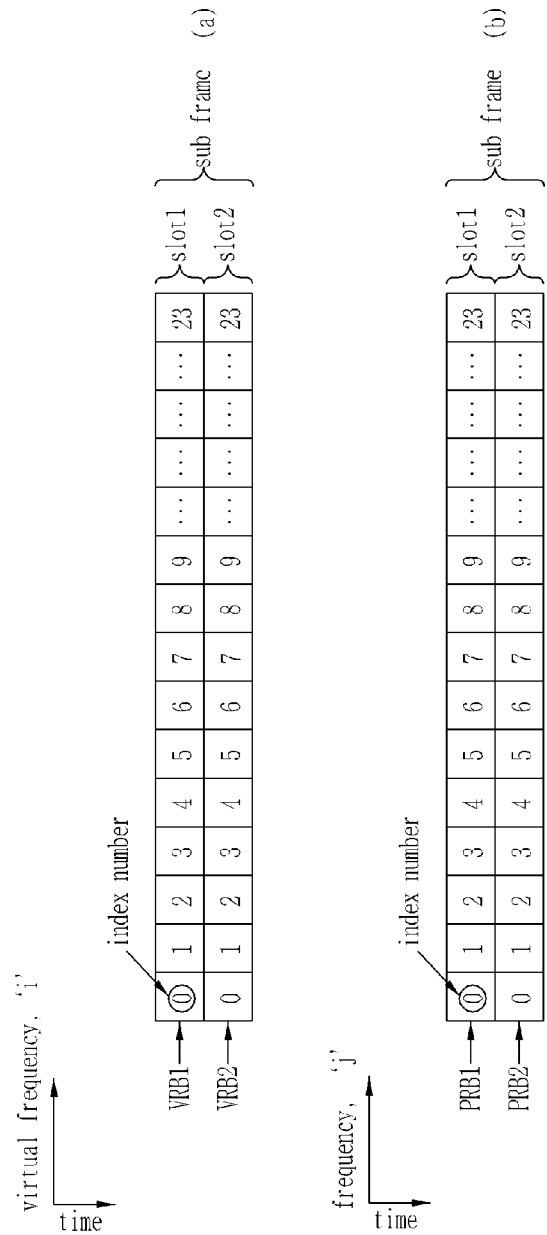
FIG. 4A is a view showing an example of the structure of VRBs in one subframe.
FIG. 4B is a view showing an example of the structure of PRBs in one subframe.
Figure 5:
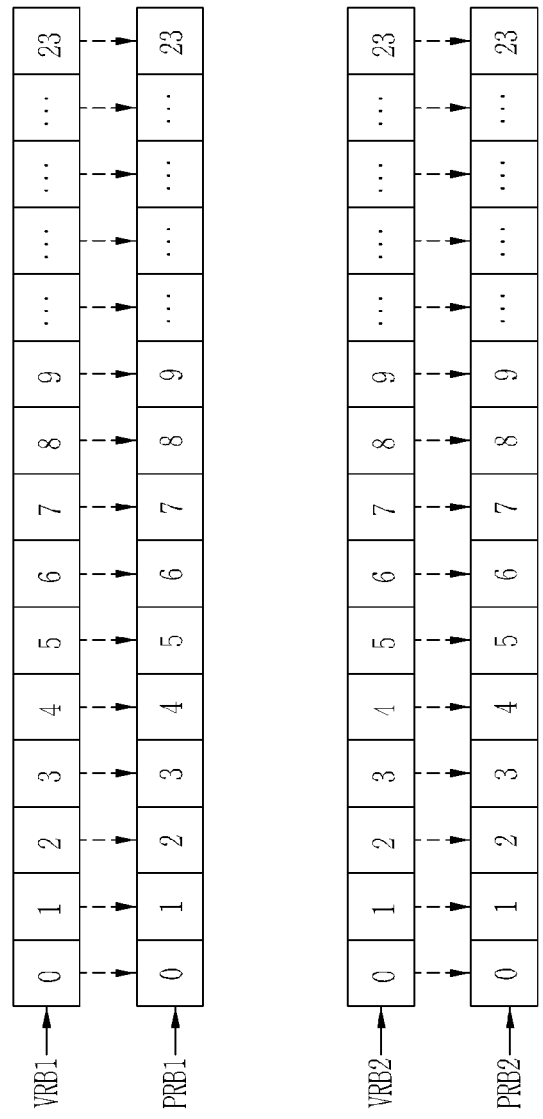
FIG. 5 is a view illustrating an example of a method for mapping LVRBs to PRBs.
Figure 6:
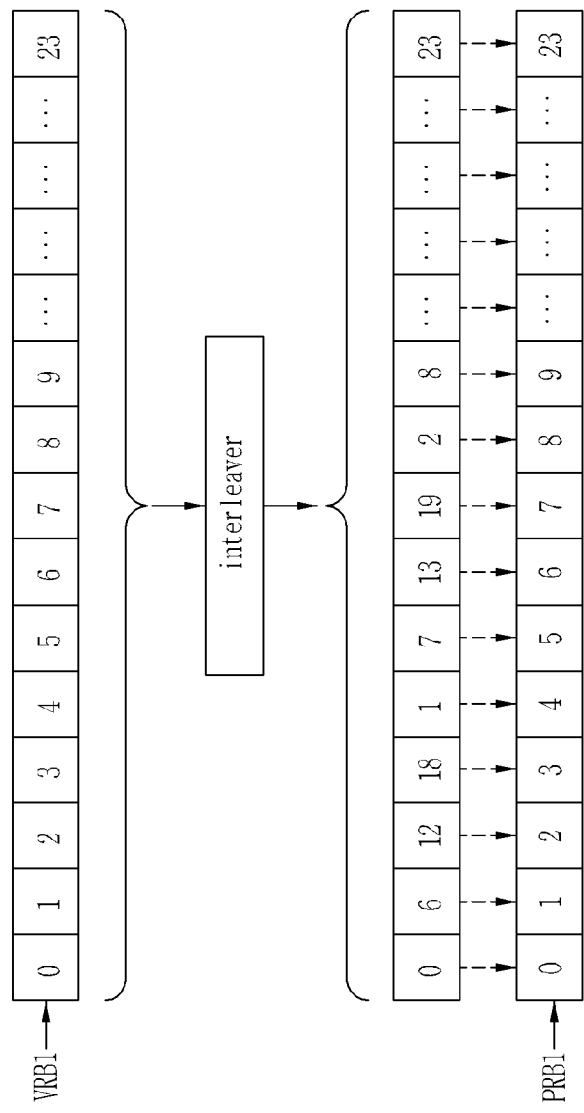
FIG. 6 is a view illustrating an example of a method for mapping DVRBs in a first slot to PRBs.
Figure 7:
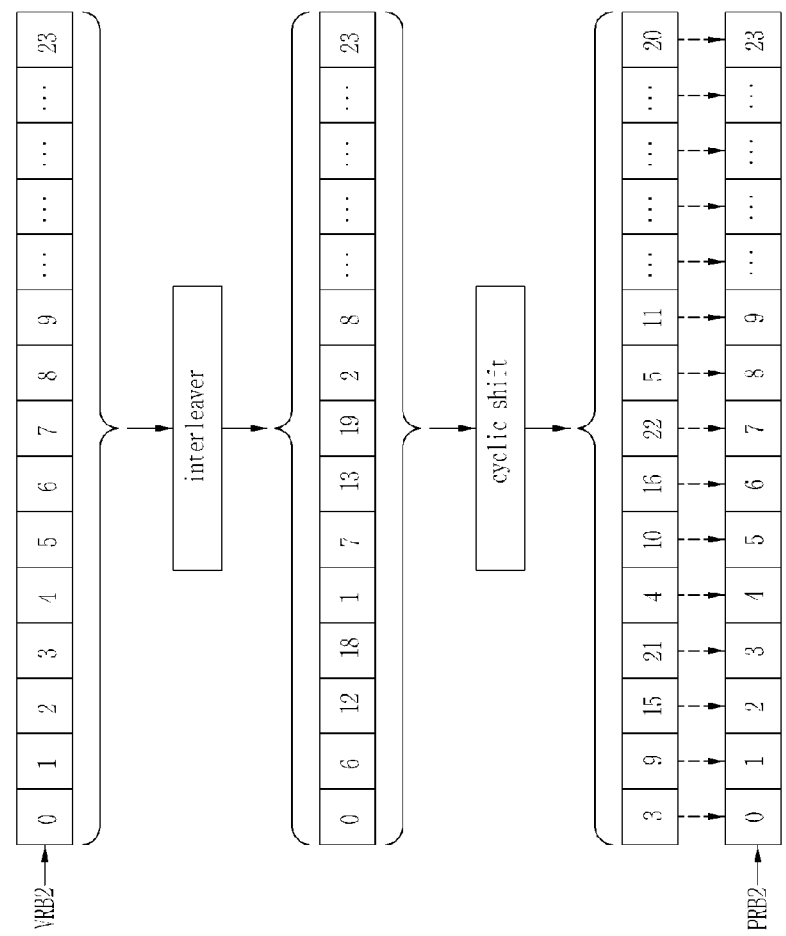
FIG. 7 is a view illustrating an example of a method for mapping DVRBs in a second slot to PRBs.

In the method of FIG. 11, DVRB indexes are constructed as shown in FIG. 1. When allowing DVRBs to correspond to PRBs, consecutive DVRB indexes can be allowed to be distributed, not correspond to contiguous PRBs. For example, a DVRB index '0' and a DVRB index '1' are not arranged contiguous to each other. In other words, in FIG. 11, DVRB indexes are arranged in the order of 0, 8, 16, 4, 12, 20, . . . , and this arrangement can be obtained by inputting the consecutive indexes in FIG. 10 to, for example, a block interleaver. In this case, it is possible to obtain distribution within each of divided parts 1101 and 1102, as well as distribution by a gap 1103. Therefore, when a UE is allocated two DVRBs as shown in FIG. 11, the diversity order increases to 4, resulting in an advantage that the diversity gain can be obtained still more.

At this time, the value of the gap indicative of the relative position difference between the divided parts can be expressed in two ways. Firstly, the gap value can be expressed by a difference between DVRB indexes. Secondly, the gap value can be expressed by a difference between indexes of PRBs to which a DVRB is mapped. In the case of FIG. 11, Gap=1 in the first way, while Gap=3 in the second way. FIG. 12 shows the latter case 1103. Meanwhile, if the total number of RBs of the system is changed, the DVRB index arrangement may be changed accordingly. In this case, the use of the second way has the advantage of grasping a physical distance between the divided parts.

In order to perform signaling of DVRB allocation, the above-mentioned LVRB compact scheme may be used. In this case, a start point of consecutively-allocated RBs and length information of the RBs correspond to a start point of VRB indexes instead of PRB indexes and length information of them, respectively.

As described above, in the compact scheme, LVRB signaling includes a start point of RBs and length information of the RBs. In order to perform the DVRB signaling, gap information may be additionally required in some cases. In order to constantly maintain the number of bits required for the entire signaling, there is a need to limit the length information such that an amount of information must be reduced. For example, in case of using 50 RBs or more, one bit of the RIV field must be assigned for gap indication, such that there is a need to reduce the number of bits required for transferring the RIV with the limitation in the length information.

On the other hand, in case of using RBs to perform the common signaling for several users, a control signaling for notifying allocated RBs must allow all users present in a cell to read information of the allocated RBs. Thus, for this control signaling, a code rate may be reduced or a transmission power may be increased, such that the resultant control signaling information having a low code rate and a high transmission power may be transferred to several users. In order to reduce the code rate of the control signaling to which limited resources are allocated, an amount of control data must be reduced. In order to reduce the amount of control data, the number of bits required for RB allocation information must be reduced.

Likewise, control message data transferred to allocated RBs must allow all users present in the cell to read corresponding information, such that the control message data is transferred at a low code rate. Assuming that the code rate is 1/20, if an amount of data increases by 16 bits, an amount of codeword made after a channel coding increases by 320 bits. In the 3GPP Long Term Evolution (LTE), assuming that one TX antenna transmission (i.e., 1 Tx antenna transmission) is carried out and one OFDM symbol is used for a control signal, the number of symbols capable of transferring payload data within one RB (i.e., 1RB) is 148. Thus, assuming that a quadrature phase shift keying (QPSK) modulation is used, the number of transferable bits is 296. As a result, data increases by 16 bits, data of 320 bits increases, such that two RBs are additionally needed.

That is, in order to maintain a low code rate, although the size of data increases a little, the number of RBs required for transferring this data greatly increases, such that the necessity for RBs to be allocated with a granularity of one RB unit (i.e., a 1RB-based granularity).

Hereinafter, a resource allocation signaling structure for establishing a step for limiting a start position with a granularity of one-RB allocation (i.e., 1RB allocation) will be described in detail.

The following equation 1 shows an exemplary signaling method based on the compact scheme which notifies a start point (S) of RBs and the number (=Length, L) of allocated RBs.

In the following description, "mod(x,y)" means "x mod y", and "mod" means a modulo operation. Also, "$\lfloor \cdot \rfloor$" means a descending operation, and represents a largest one of integers equal to or smaller than a numeral indicated in "$\lfloor \ \rfloor$". On the other hand, "$\lceil \cdot \rceil$" means an ascending operation, and represents a smallest one of integers equal to or larger than a numeral indicated in "$\lceil \ \rceil$". Also, "round($\cdot$)" represents an integer nearest to a numeral indicated in "( )". "min(x,y)" represents a smaller value selected between x and y, whereas "max(x,y)" represents a larger value selected between x and y.

if $L-1 \leq \lfloor N_{RB}/2 \rfloor$ then $RIV = N_{RB}(L-1)+S$ else $RIV = N_{RB}(N_{RB}-L+1)+(N_{RB}-1-S)$ End Required bits $N_{bit\_required} = \lceil \log_2(RIV_{max}+1) \rceil$ Without limitation $RIV_{max} = N_{RB} \cdot (N_{RB}+1)/2-1$ With limitation $L^{Limit}$ $RIV_{max} = \min\{N_{RB} \cdot (N_{RB}+1)/2-1, N_{RB}(L^{limit}-1)+N_{RB}-L^{limit}\}$ [Equation 1]

Assuming that the total number of all available RBs is denoted by $N_{RB}$ and the beginning number of indexes to be assigned to the RBs is set to 0, indexes from 0 to $N_{RB}-1$ are sequentially assigned to the RBs. In this case, $N_{RB}$ may be the total number of all RBs contained in a system band, the number of all RBs used as VRBs, or the number of RBs contained in any limited area.

Thus, the range of S may be $0 \leq S \leq N_{RB}-1$, and the range of allocable 'L' value is changed according to this S value. In another view, the L value is in the range of $1 \leq L \leq N_{RB}$, and the range of available S value is changed according to the L value. Namely, a certain S value is unable to be combined with a specific L value.

A maximum value of each of the S and L values may be represented by a binary number, regardless of such impossible combinations. A bit field for this binary number may be constructed for each of the S and L values. In case of transmitting each of the bit fields, if $N_{RB}$ is 20 (i.e., $N_{RB}=20$), 20 is less than $2^5$ (i.e., $20<2^5$), so that 5 bits for the S value and 5 bits for the L values, namely, a total of 10 bits, are needed. However, overhead of unnecessary transmission bits is generated because these 10 bits include even information of useless combinations incapable of being actually generated. Thus, if each generable combination of S and L values is represented by 'RIV', this RIV is converted into a binary number according to binary representation, and the resultant RIV of the binary number is then transferred, the number of transmission bits can be reduced.

FIG. 12 is a view illustrating an example of RIVs when $N_{RB}=20$.

As can be seen from FIG. 12, 'RIV' is decided according to S and L values. In case of calculating 'RIV' related to $0 \leq S \leq N_{RB}-1$ in each of all L values using Equation 1, RIVs of FIG. 12 are made. The value of each element shown in FIG. 12 is 'RIV' indicating a combination of S and L values corresponding to the above element. Values contained in a left upper part covering the almost half of FIG. 12 correspond to generable combinations of S and L values when $N_{RB}=20$, and values contained in a right lower part colored in gray, covering the other half of FIG. 12, correspond to combinations of S and L values incapable of being generated.

In this scheme, RIVs present in the gray-colored part under the condition of L−1≦⌊$N_{RB}$/2⌋, are mapped to RIVs under the other condition of L−1>⌊$N_{RB}$/2⌋, such that there are no RIVs to be wasted. For example, if N is set to 20 (i.e., $N_{RB}$=20), RIVs present in a specific part corresponding to L<⌊$N_{RB}$/2⌋+1=⌊20/2⌋+1=11 among the right lower part of FIG. 12 are reused in another part corresponding to L>⌊$N_{RB}$/2⌋+1=⌊20/2⌋+1=11 among the left upper part of FIG. 12. In this case, a maximum value (i.e., a maximum RIV) among RIVs present in the left upper end is 209.

In this scheme, the maximum RIV may influence the number of transmission bits, RIVs below the maximum RIV may not be mapped to values incapable of being obtained by combinations of actual S and L values. That is, all values below the maximum RIV correspond to generable combinations of S and L values.

In case of separately transmitting the S value, a maximum S value is 19, such that 5 bits are needed to indicate this S value '19' (where 0≦19<$2^5$). In case of separately transmitting the L value, a maximum L value is 20, such that 5 bits are needed to indicate this L value '20' (where 0≦20<$2^5$). Therefore, in case of transmitting the S and L values independent of each other, 10 bits are needed in the end. However, the RIVs are in the range of 0≦RIV≦209<$2^8$, such that 8 bits are needed to indicate these RIVs, as denoted by $N_{bit\_required}$=8. As a result, it can be recognized that 2 bits are saved as compared to the above case of transmitting the S and L values independent of each other.

In the meantime, in the above-mentioned RIV construction method, if a maximum value (=$L^{limit}$) of allocable RBs is limited, i.e., if the L value is limited to $L^{limit}$ or less, the number of required bits may be reduced.

In FIG. 12, if $L^{limit}$ is set to 6 (i.e., $L^{limit}$=6), the range of generable L values is given as 1≦L≦6, combinations having other L values having the range of 7≦L≦20 are not in use. At this time, it can be recognized that a maximum RIV among RIVs is 114. That is, the range of generable RIVs is given as 0≦RIV≦114<$2^7$, so that the number of required bits is 7 as denoted by $N_{bit\_required\_lim}$=7.

However, in case of using RBs for the common signalling as described above, there is a need to reduce the number of bits used for resource allocation. Thus, a method for limiting the S and L values according to the present invention will hereinafter be described in detail.

Embodiment 1

A method for limiting each of S and L values to a multiple of G (where G is a positive integer) according to a first embodiment of the present invention will hereinafter be described.

If each of the S and L values is limited to a multiple of G, a maximum RIV among RIVs represented by combinations of S and L values can be lowered. That is, an incremental step of the S value may be set to G, and an incremental granularity of the L value may be established in units of G.

FIG. 13 shows RIVs related to generable combinations of S and L values under the condition that $N_{RB}$ is 20 ($N_{RB}$=20) and G is 2 (G=2) according to the first embodiment.

A gray-colored area of FIG. 13 corresponds to combinations of S and L values incapable of being generated under the condition that $N_{RB}$ is 20 ($N_{RB}$=20) and G is 2 (G=2). The RIVs are in the range of 0≦RIV≦54<$2^6$, such that 6 bits are needed to indicate these RIVs, as denoted by $N_{compact\_bit}$=6.

If a step of the start point and its granularity are all set to G, the number of bits used for expressing RIVs becomes lower than that of the conventional scheme.

In this way, provided that $L^{limit}$ may be fixed to limit a maximum value among available L values, the number of required bits may be further reduced. As can be seen from FIG. 13, if $L^{limit}$ is set to 6, it can be recognized that a maximum RIV is 27. At this time, because combinations each having the L value within the range of 8≦L≦20 are not in use, RIVs are in the range of 0≦RIV≦27<$2^5$, such that the number of required bits is 5 as denoted by $N_{bit\_required\_lim}$=5.

The following equation 2 is used to obtain RIVs according to S and L values under the condition that $N_{RB}$ and G are given. In this case, the number of bits required for expressing the RIVs may be calculated in different ways according to the setting of $L^{limit}$. If a maximum length of RBs is needed, $L^{limit}$ is denoted by $L^{limit}$=G·⌈$L^{max\_required}$/G⌉. If a maximum allowable amount of RBs is given, $L^{limit}$ is denoted by $L^{limit}$=G·⌈$L^{max\_allowed}$/G⌉.

<T=G>
Step: T=G RBs
Granularity: G RBs if $(L/G-1) \leq \lfloor \lfloor N_{RB}/G \rfloor/2 \rfloor$ then

RIV=⌊$N_{RB}$/G⌋·(L/G−1)+S/G else

RIV=⌊$N_{RB}$/G⌋·(⌊$N_{RB}$/G⌋−L/G+1)+(⌊$N_{RB}$/G⌋−1−S/G)

end

Required bits $N_{bit\_required}$=⌈$\log_2$($RIV_{max}$+1)⌉

Without limitation $RIV_{max}$=⌊$N_{RB}$/G⌋·(⌊$N_{RB}$/G⌋+1)/2−1

With limitation $L^{limit}$=G·⌈$L^{max\_required}$/G⌉ or G·⌊$L^{max\_allowed}$/G⌋

$RIV_{max}$=min(⌊$N_{RB}$/G⌋($L^{limit}$/G−1)+⌊$N_{RB}$/G⌋−$L^{limit}$/G,

⌊$N_{RB}$/G⌋·(⌊$N_{RB}$/G⌋+1)/2−1}}   [Equation 2]

As can be seen from Equation 2, parameters of equations constructing the above Equation 1 are substituted into others in Equation 2, such that there is an advantage in that the existing equation can be used without any change. In more detail, Equation 1 showing a method for deciding a start point and a length on a basis of one RB may correspond to the following equation 3 under the condition that X=$N_{RB}$, Y=L, and Z=S. Equation 2 showing a method for deciding a start point and a length in units of G RBs may correspond to the following equation 3 under the condition that X=⌊$N_{RB}$/G⌋, Y=L/G, and Z=S/G.

if

Y−1≦⌊X/2⌋

RIV=X(Y−1)+Z else

RIV=X(X−Y+1)+(X−1−Z)

End   [Equation 3]

This relationship may also be represented by the following expression 1.

Method of deciding Start Point and Length in units of one RB (1 RB)

$X=N_{RB}, Y=1, Z=S$ if $Y-1 \leq \lfloor X/2 \rfloor$ $RIV=X(Y-1)+Z$ else $RIV=X(X-Y+1)+(X-1-Z)$ End Method of deciding start point and length in units of G RBs $X=\lfloor N_{RB}/G \rfloor, Y=L/G, Z=S/G$ if $Y-1 \leq \lfloor X/2 \rfloor$ $RIV=X(Y-1)+Z$ else $RIV=X(X-Y+1)+(X-1-Z)$ End  [Expression 1]

On the other hand, assuming that $N_{RB}$ is a multiple of G, each RIV obtained by the above equation which has been made to calculate RIVs using combinations of S and L values in units of one RB (1 RB) is divided by G, such that the resultant RIV obtained by this division becomes any one of RIVs obtained by combinations of S and L values in units of G RBs. Therefore, assuming that N is a multiple of G, the RIV may be represented by the following expression 2.

Method for deciding Start Point and Length in units of G RBs in case that $N_{RB}$ is a multiple of G if $L-1 \leq \lfloor N_{RB}/2 \rfloor$ then $RIV'=N_{RB}(L-1)+S$ else $RIV'=N_{RB}(N_{RB}-L+1)+(N_{RB}-1-S)$ End $RIV=RIV'/G$  [Expression 2]

If the total number of all RBs of the system is set to $N_{PRB}$, $N_{VRB}$ indicating the number of VRBs used for allocating RB indexes or RB numbers may be equal to or less than $N_{PRB}$. Because each of allocated RB indexes according to the method of Equation 2 proposed by the present invention is a multiple of G, the number of RBs used for this allocation may also be denoted by a multiple of G. Thus, if $N_{RB}$ for use in the above expression is not a multiple of G, RBs as many as a remainder made when $N_{RB}$ is divided by G may not be used for RB allocation. Therefore, it is preferable that $N_{RB}$ be set to $N_{RB}=\lfloor N_{VRB}/G \rfloor \cdot G$. Under this condition denoted by $N_{RB}=\lfloor N_{VRB}/G \rfloor \cdot G$, it can be recognized that $X=\lfloor N_{RB}/G \rfloor = \lfloor \lfloor N_{VRB}/G \rfloor \cdot G/G \rfloor = \lfloor \lfloor N_{VRB}/G \rfloor \rfloor = \lfloor N_{VRB}/G \rfloor$ is made.

Assuming that the number of actually available RBs is $N_{VRB}$, due to granularity restriction, RBs as many as a remainder made when $N_{VRB}$ is divided by G, i.e., $N_{RB}^{remain}=N_{VRB}-\lfloor N_{VRB}/G \rfloor \cdot G$ remaining RBs, may not be allocated.

In order to allocate such remaining RBs, $N_{RB}$ may be set to $N_{RB}=\lceil N_{VRB}/G \rceil \cdot G$. However, under this condition $N_{RB}=\lceil N_{VRB}/G \rceil \cdot G$, if the remaining RBs are allocated, the L value may include the number of imaginary RBs, i.e., $N_{RB}^{imaginary}=\lceil N_{VRB}/G \rceil \cdot G - N_{VRB}$. As a result, if the remaining RBs are allocated, the length of actually-allocated RBs becomes $L - N_{RB}^{imaginary}$.

Embodiment 2

According to this embodiment, an optimization method, under the condition that each of S and L values is limited to a multiple of G (where G is a positive integer) and $L^{limit}$ is established, will hereinafter be described in detail.

FIG. 14 shows RIVs related to generable combinations of S and L values under the condition that $N_{RB}$ is 40 ($N_{RB}=40$) and G is 2 (G=2) in the method disclosed in the first embodiment. In this case, it can be recognized that a maximum RIV among RIVs on the condition that $L^{limit}$ is 14 (i.e., $L^{limit}=14$) is 133.

If $L^{limit}$ is set to 14 ($L^{limit}=14$), 8 bits are needed due to $0 \leq RIV \leq 133 < 2^8$. However, RIVs (=39, 58~59, 77~79, 96~99, 115~119) included in the gray-colored part (see FIG. 14) under the condition $4 \leq L \leq 12$ may not be used as RIVs although the RIVs (=39, 58~59, 77~79, 96~99, 115~119) are less than the maximum RIV 133. That is, the number of bits required for transmitting RIVs may be wasted. In order to remove the wasted RIVs, under the condition that $N_{RB}$, G and $L^{limit}$ are limited, there is a need to construct a table for RIVs such that all numbers below the maximum RIV among RIVs corresponding to combinations of S and L values can be actually available. That is, all RIVs in the range from 0 to the maximum RIV must represent combinations of actually-generable S and L values.

FIG. 15 shows RIVs related to generable combinations of S and L values under the condition that $N_{RB}$ is 40 ($N_{RB}=40$), G is 2 (G=2), and $L^{limit}$ is 14 ($L^{limit}=14$) according to the second embodiment.

Due to $0 \leq RIV \leq 118 < 2^7$, the number of required bits $N_{bit\_required\_lim}$ is 7. In this case, it can be recognized that bits for representing generable combinations of S and L values are not wasted because RIVs included in the gray-colored part having L values in the range of $2 \leq L \leq 6$ are used in generable combinations of S and L values under the condition $10 \leq L \leq 14$. Thus, compared with the method of FIG. 14, signaling overhead is reduced by one bit when performing signaling of the same RB-allocation combinations as those of FIG. 14.

The following equation 4 is used to obtain RIVs using combinations of S and L values under the condition that $N_{RB}$, G and $L^{limit}$ are given in the method of FIG. 15. In this case, the number of required bits may also be calculated by equations included in Equation 4. If a maximum length of RBs is limited, $L^{limit}$ is denoted by $L^{Limit}=G\cdot\lceil L^{max\_required}/G\rceil$. If a maximum allowable amount of RBs is given, $L^{limit}$ is denoted by $L^{limit}=G\cdot\lfloor L^{max\_allowed}/G\rfloor$.

<T=G, Optimized for limitation $L^{limit}$>
Step: T=G RBs
Granularity: G RBs
Optimized for limitation $$L^{limit}=G\cdot\lceil L^{max\_required}/G\rceil \text{ or } G\cdot\lfloor L^{max\_allowed}/G\rfloor$$

if $$L/G\leq\lceil L^{limit}/G/2\rceil$$

then $$RIV=(2\cdot\lfloor N_{RB}/G\rfloor-L^{limit}/G+1)(L/G-1)+S/G$$

else $$RIV=(2\cdot\lfloor N_{RB}/G\rfloor-L^{limit}/G+1)(L^{limit}/G-L/G+1)-(1+S/G)$$

end

Required bits if $$L^{limit}/G/2\leq\lceil L^{limit}/G/2\rceil$$

then $$RIV_{max}=(2\cdot\lfloor N_{RB}/G\rfloor-L^{limit}/G+1)(L^{RIVmax}/G-1)+\lfloor(N_{RB}-L^{RIVmax})/G\rfloor$$

else $$RIV_{max}=(2\cdot\lfloor N_{RB}/G\rfloor-L^{limit}/G+1)(L^{RIVmax}/G)-1$$

end where $$L^{RIVmax}=\min(G\cdot\lceil N_{RB}/G/2\rceil,\cdot L^{limit}) \qquad \text{[Equation 4]}$$

Assuming that the number of actually available RBs is $N_{VRB}$, due to the granularity restriction, RBs as many as a remainder made when $N_{VRB}$ is divided by G, i.e., $N_{RB}^{remain}=N^{VRB}-\lfloor N_{VRB}/G\rfloor\cdot G$ remaining RBs, may not be allocated. In order to allocate such remaining RBs, $N_{RB}$ may be set to $N_{RB}=\lceil N_{VRB}/G\rceil\cdot G$. However, under this condition $N_{RB}=\lceil N_{VRB}/G\rceil\cdot G$, if the remaining RBs are contained and allocated, the L value may include the number of imaginary RBs, i.e., $N_{RB}^{imaginary}=\lceil N_{VRB}/G\rceil\cdot G-N_{VRB}$. As a result, if the remaining RBs are contained and allocated, the length of actually-allocated RBs is denoted by $L-N_{RB}^{imaginary}$.

Embodiment 3

According to a third embodiment, a method of constructing an optimum table of RIVs, under the condition that S is limited to a multiple of T (where T is a positive integer) and L is limited to a multiple of G (where G is a positive integer), will hereinafter be described in detail.

In the above-mentioned first embodiment, it is assumed that the position of a start point of allocated RBs and the length of the RBs are each limited to a multiple of G (where G is a positive integer). However, in the third embodiment, the start point is limited to one of multiples of a first positive integer, and the length is limited to one of multiples of a second positive integer which is independent from the first positive integer, respectively. That is, S is limited to a multiple of T, and L is limited to a multiple of G.

FIG. 16 shows RIVs related to generable combinations of S and L values under the condition that $N_{RB}$ is 20 ($N_{RB}$=20), S is a multiple of T(=4), and L is a multiple of G(=2) according to the third embodiment.

FIG. 17 shows RIVs related to generable combinations of S and L values under the condition that N is 20 ($N_{RB}$=20), S is a multiple of T(=2), and L is a multiple of G(=4) according to the third embodiment.

In FIGS. 16 and 17, the gray-colored parts correspond to combinations of S and L values incapable of being generated under $N_{RB}$=20.

If T=2 and G=4, RIVs are in the range of $0\leq RIV\leq 26<2^5$, such that 5 bits are needed to represent these RIVs, as denoted by $N_{bit\_required}$=5. In this case, if $L^{limit}$ is set to 8 ($L^{limit}$=8), RIVs are in the range of $0\leq RIV\leq 15<2^4$, such that 4 bits are needed to represent these RIVs, as denoted by $N_{bit\_required\_lim}$=4.

If T=4 and G=2, RIVs are in the range of $0\leq RIV\leq 29<2^5$, such that 5 bits are needed to represent these RIVs, as denoted by $N_{bit\_required}$=5. In this case, if $L^{limit}$ is set to 8 ($L^{limit}$=8), RIVs are in the range of $0\leq RIV\leq 18<2^5$, such that 5 bits are needed to represent these RIVs, as denoted by $N_{bit\_required\_lim}$=5.

The following equation 5 is made to calculate RIVs using combinations of S and L values under the condition that $N_{RB}$, T, and G are given. In this case, the number of required bits may be calculated in different ways according to $L^{limit}$. Under this condition, it is assumed that T or G is an integer multiple of min(T, G). If the maximum length of RBs is limited, $L^{limit}$ is denoted by $L^{limit}=G\cdot\lceil L^{max\_required}/G\rceil$. A maximum allowable amount of RBs is given, $L^{limit}$ is denoted by $L^{limit}=G\lfloor L^{max\_allowed}/G\rfloor$.

<T and G are Independent>
Step: T RBs
Granularity: G RBs if $$(L/G-1)\leq\lfloor N_{RB}/G/2+\text{mod}(\lfloor N_{RB}/G\rfloor-1,T/G)/2\rfloor$$

then $$RIV=\lceil(N_{RB}-G+1)/T\rceil(L/G-1)+S/T$$

else $$RIV=\lceil(N_{RB}-G+1)/T\rceil(\lfloor N_{RB}/G\rfloor-L/G+1+\text{mod}(\lfloor N_{RB}/G\rfloor-1,T/G))+(\lceil(N_{RB}-G+1)/T\rceil-1-S/T)$$

end

Required bits $$N_{bit\_required}\lceil\log_2(RIV_{max}+1)\rceil$$

if $$(L^{RIVmax}/G-1)\leq\lfloor N_{RB}/2/G+\text{mod}(\lfloor N_{RB}/G\rfloor-1,T/G)/2\rfloor$$

then $$RIV_{max}=\lceil(N_{RB}-G+1)/T\rceil(L^{RIVmax}/G-1)+S^{RIVmax}/T$$

else $$RIV_{max}=\lceil(N_{RB}-G+1)/T\rceil(L^{RIVmax}/G-1)-1$$

end where, $$S^{RIVmax} = \lfloor (N_{RB} - L^{RIVmax})/T \rfloor T$$

Without limitation $$L^{RIVmax} = G \cdot [\text{round}(N_{RB}/2/G + \text{mod}(\lfloor N_{RB}/G \rfloor - 1, T/G)/2) + 1]$$

With Limitation $$L^{linit} = G \cdot \lceil L^{max\_required}/G \rceil \text{ or } G \cdot \lfloor L^{max\_allowed}/G \rfloor$$

$$L^{RIVmax} = \min(G \cdot [\text{round}(N_{RB}/2/G + \text{mod}(\lfloor N_{RB}/G \rfloor - 1, T/G)/2) + 1], L^{linit})$$

Assuming that the number of actually available RBs is $N_{VRB}$, some RBs having large indexes may not be allocated due to the granularity restriction. In order to allocate such remaining RBs, $N_{RB}$ may be set to $N_{RB} = \lceil N_{VRB}/\max(T, G) \rceil \cdot \max(T, G)$. However, under this condition, if the remaining RBs are allocated, the L value may include the number of imaginary RBs, i.e., $N_{RB}^{imaginary} = S + L - N_{VRB}$. As a result, if the remaining RBs are allocated, the length of actually-allocated RBs is denoted by $L - N_{RB}^{imaginary} = N_{VRB} - S$.

Embodiment 4

According to a fourth embodiment, an optimization method, under the condition that S starts from P and then increases by a multiple of G, and L starts from K and then increases by a multiple of G, will hereinafter be described in detail.

In the first embodiment, it is assumed that the position of a start point of allocated RBs and the length of the RBs are each limited to a multiple of G (where G is a positive integer). In other words, the first embodiment assumes that the start point S of RBs start from 0 and then increases by G, and the length L of RBs starts from 1 and then increases by G.

The following fourth embodiment relates to a method for constructing RIVs under the condition that the start point S of RBs starts from an offset P and then increases by G, and the length L of RBs starts from another offset K and then increases by G That is, this fourth embodiment relates to a method for constructing RIVs under $S \in \{P, P+G, P+2G, P+3G, \ldots\}$ and $L \in \{K, K+G, K+2G, K+3G, \ldots\}$.

FIG. 18 shows RIVs related to generable combinations of S and L values when $N_{RB} = 20$, $G = 2$, $P = 1$, and $K = 4$ according to the fourth embodiment. The gray-colored part of FIG. 18 corresponds to combinations of S and L values incapable of being actually generated when $N_{RB} = 20$. RIVs are in the range of $0 \leq RIV \leq 35 < 2^6$, such that 6 bits are needed to represent these RIVs.

If the range of available L values is limited by establishment of $L^{limit}$, the number of required bits may be reduced. Referring to FIG. 18, if $L^{limit}$ is set to 8 ($L^{limit} = 8$), it can be recognized that a maximum RIV among RIVs is 21. In this case, because combinations having L values in the range of $10 \leq L \leq 18$ may not be used, the range of RIVs may be $0 \leq RIV \leq 21 < 2^5$, such that 5 bits are needed to represent these RIVs as denoted by '$N_{bit\_required\_lim} = 5$'.

The following equation 6 is made to calculate RIVs using combinations of S and L values under the condition that $N_{RB}$, T, and G are given. Under this condition, it is assumed that T or G is an integer multiple of $\min(T, G)$. If the length of RBs is limited, $L^{limit}$ is denoted by $L^{limit} = G \cdot \lceil (L^{max\_required} - K)/G \rceil + K$. If a maximum allowable amount of RBs is given, $L^{limit}$ is denoted by $L^{Limit} = G \cdot \lfloor (L^{max\_allowed} - K)/G \rfloor + K$.

[Equation 6]

$< T = G$ starting from offset $P$ and $K$, respectively $>$

Step: $T = G$ RBs starting from $P$

Granularity: $G$ RBs starting from $K$ if $(L - K)/G \leq \lfloor \lfloor (N_{RB} - P - K)/G + 1 \rfloor / 2 \rfloor$ then $RIV = \lfloor (N_{RB} - P - K)/G + 1 \rfloor \cdot (L - K)/G + (S - P)/G$ else $RIV = \lfloor (N_{RB} - P - K)/G + 1 \rfloor \cdot (\lfloor (N_{RB} - P - K)/G + 1 \rfloor -$ $(L - K)/G) +$ $(\lfloor (N_{RB} - P - K)/G + 1 \rfloor - 1 - (S - P)/G)$ end Required bits $N_{bit\_required} = \lceil \log_2(RIV_{max} + 1) \rceil$ Without limitation $RIV_{max} = \lfloor (N_{RB} - P - K)/$ $G + 1 \rfloor \cdot (\lfloor (N_{RB} - P - K)/G + 1 \rfloor + 1)/2 - 1$ With limitation $L^{linit} = G \cdot \lceil (L^{max\_required} - K)/G \rceil + K$ or $G \cdot \lfloor (L^{max\_allowed} - K)/G \rfloor + K$ $$RIV_{max} = \min\left\{\begin{array}{l} \lfloor (N_{RB} - P - K)/G + 1 \rfloor \cdot (L^{linit} - K)/G + \\ \lfloor (N_{RB} - L^{linit} - P)/G \rfloor, \\ \lfloor (N_{RB} - P - K)/G + 1 \rfloor \cdot (\lfloor (N_{RB} - P - K)/ \\ G + 1 \rfloor + 1)/2 - 1 \end{array}\right\}$$

On the other hand, parameters of equations constructing the above Equation 1 are substituted into others in Equation 6, such that Equation 6 has an advantage in that it can use the existing equation without any change. In more detail, Equation 1 showing the method for deciding the start point and the length on a basis of one RB may correspond to Equation 3 under the condition that $X = N_{RB}$, $Y = L$, and $Z = S$. Equation 6 shows the method for controlling the start point of RBs to start from P and then increase in units of G, and controlling the length of RBs to start from K and then increase in units of G. This Equation 6 may correspond to Equation 3 under the condition that $X = \lfloor (N_{RB} - P - K)/G \rfloor$, $Y - 1 = (L - K)/G$, and $Z = (S - P)/G$.

This relationship may also be represented by the following expression.

[Expression]

Method of deciding Start Point and Length in units of one RB $X = N_{RB}, Y = L, Z = S$ if $Y - 1 \leq \lfloor X/2 \rfloor$ $RIV = X(Y - 1) + Z$ else $RIV = X(X - Y + 1) + (X - 1 - Z)$ End Method of controlling Start Point of RBs to start from P and then increase in units of G, and controlling Length of RBs to start from K and then increase in units of G $X = \lfloor(N_{RB}-P-K)/G\rfloor, Y-1 = (L-K)/G, Z = (S-P)/G$ if $Y-1 \leq \lfloor X/2 \rfloor$ $RIV = X(Y-1)+Z$ else $RIV = X(X-Y+1)+(X-1-Z)$ end Assuming that the number of actually available RBs is $N_{VRB}$, due to granularity restriction, RBs as many as a remainder made when $N_{VRB}$ is divided by G, i.e., $N_{RB}^{remain} = \lfloor(N_{RB}-K-P)/G\rfloor \cdot G + K + P - N_{VRB}$ remaining RBs, may not be allocated.

In order to allocate such remaining RBs, $N_{RB}$ may be set to $N_{RB} = \lceil(N_{VRB}-K-P)/G\rceil \cdot G + K + P$. However, under this condition, if the remaining RBs are allocated, the L value may include the number of imaginary RBs, i.e., $N_{RB}^{imaginary} = \lceil(N_{VRB}-K-P)\rceil$. As a result, if the remaining RBs are allocated, the length of actually-allocated RBs is denoted by $L - N_{RB}^{imaginary}$.

Embodiment 5

According to a fifth embodiment, an optimization method, under the condition that S starts from P and then increases by a multiple of T, and L starts from K and then increases by a multiple of G, will hereinafter be described in detail.

As can be seen from the fourth embodiment, it is assumed that the position of a start point of allocated RBs and a length of the RBs are each limited to a multiple of G (where G is a positive integer), the position of each start point is limited to start from P, and the length is limited to start from K.

The fifth embodiment relates to a method for constructing RIVs, under the condition that the start point 'S' of RBs starts from an offset P and increases by T, and the length 'L' of RBs starts from another offset K and increases by G. That is, the fifth embodiment describes a method for constructing RIVs under S∈{P, P+T, P+2T, P+3T, ...}, L∈{K, K+G, K+2G, K+3G, ...}.

FIG. 19 shows RIVs related to generable combinations of S and L values when $N_{RB}=30$, T=4, G=2, P=1, and K=4 according to the fifth embodiment. The gray-colored part of FIG. 19 corresponds to combinations of S and L values incapable of being actually generated when $N_{RB}=30$. RIVs are in the range of $0 \leq RIV \leq 48 < 2^6$, such that 6 bits are needed to represent these RIVs.

If the range of available L values is limited by establishment of $L^{limit}$, the number of required bits may be reduced. Referring to FIG. 19, if $L^{limit}$ is set to 10 ($L^{limit}=10$), it can be recognized that a maximum RIV among RIVs is 25. In this case, because combinations having L values in the range of $12 \leq L \leq 28$ may not be used, the range of RIVs may be $0 \leq RIV \leq 21 < 2^5$, such that 5 bits are needed to represent these RIVs as denoted by '$N_{bit\_required\_lim}=5$' bits.

The following equation 7 is made to calculate RIVs using combinations of S and L values under the condition that $N_{RB}$, T, G, P and K are given. In this case, the number of bits required for expressing the RIVs may be calculated in different ways according to $L^{limit}$. Referring to Equation 7, $L^{max\_required}$ may represent the number of actually available RBs. At this time, if there are remaining RBs due to the granularity restriction, the number of the remaining RBs is subtracted from the number of actually available RBs, and the subtraction result value may be represented by $L^{max\_allowed}$. In this case, in order to enable the actually-available RBs to be all allocated, $L^{limit}$ is set to $L^{limit} = G \cdot \lceil(L^{max\_required}-K)/G\rceil + K$. In order to prevent the remaining RBs among the actually-available RBs from being allocated, $L^{limit}$ is set to $L^{limit} = G \cdot \lfloor(L^{max\_allowed}-K)/G\rfloor + K$.

[Equation 7]

$<T$ and $G$ are Independent starting from offset values $P$ and $K$, respectively$>$ Step: $T$ RBs starting from $P$ Granularity: $G$ RBs starting from $K$ if $(L-K)/G \leq \lfloor\lceil(N_{RB}-P-K+1)/G\rceil/2 +$
$\quad \mod(\lceil(N_{RB}-P-K+1)/G\rceil-1, T/G)/2\rfloor$ then $RIV = \lceil(N_{RB}-P-K+1)/T\rceil \cdot (L-K)/G + (S-P)/T$ else $RIV = \lceil(N_{RB}-P-K+1)/T\rceil \cdot$
$\quad \{\lceil(N_{RB}-P-K+1)/G\rceil - (L-K)/G +$
$\quad \mod(\lceil(N_{RB}-P-K+1)/G\rceil-1, T/G)\} +$
$\quad (\lceil(N_{RB}-P-K+1)/T\rceil - 1 - (S-P)/G)$ end Required bits $N_{bit\_required} = \lceil\log_2(RIV_{max}+1)\rceil$ if $(L^{\overline{RIV_{max}}}-K)/G \leq$
$\quad \lfloor\lceil(N_{RB}-P-K+1)/G\rceil/2 +$
$\quad \mod(\lceil(N_{RB}-P-K+1)/G\rceil-1, T/G)/2\rfloor$ then $RIV_{max} = \lceil(N_{RB}-P-K+1)/T\rceil \cdot (L^{\overline{RIV_{max}}}-K)/G +$
$\quad \lfloor(N_{RB}-L^{\overline{RIV_{max}}}-P)/T\rfloor$ else $RIV_{max} = \lceil(N_{RB}-P-K+1)/T\rceil \cdot (L^{\overline{RIV_{max}}}-K)/G - 1$ Where, Without limitation $L^{\overline{RIV_{max}}} = G \cdot \text{round}(\lceil(N_{RB}-P-K+1)/G\rceil/2 +$
$\quad \mod(\lceil(N_{RB}-P-K+1)/G\rceil -$
$\quad 1, T/G)/2) + K$ With limitation $L^{\overline{Limit}}$ $L^{\overline{RIV_{max}}} = $
$\min\left\{\begin{array}{l} G \cdot \text{round}(\lceil(N_{RB}-P-K+1)/G\rceil/2 + \\ \mod(\lceil(N_{RB}-P-K+1)/G\rceil-1, T/G)/2) + K, \\ L^{\overline{Limit}} \end{array}\right\}$, $L^{limit} = G \cdot \lceil(L^{max\_required}-K)/G\rceil + K$ or, $L^{limit} = G \cdot \lceil(L^{max\_allowed}-K)/G\rceil + K$ In this case, because the above RBs are continuously allocated RBs, $L^{Limit}$, $L^{max\_required}$, and $L^{max\_allowed}$, may be represented as $L_{CRBs}^{Limit}$, $L_{CRBs}^{max\_required}$, and $L_{CRBs}^{max\_allowed}$, respectively.

Assuming that the number of actually available RBs is set to $N_{VRB}$, some RBs having large indexes may not be allocated due to the granularity restriction. In order to allocate such remaining RBs, $N_{RB}$ may be set to $N_{RB} = \lceil (N_{VRB} - K - P)/\max(T,G) \rceil \cdot \max(T,G) + K + P$. However, under this condition, if the remaining RBs are contained and allocated, the L value may include the number of imaginary RBs, i.e., $N_{RB}^{imaginary} = S + L - N_{VRB}$. As a result, if the remaining RBs are contained and allocated, the length of actually-allocated RBs is denoted by $L - N_{RB}^{imaginary} = N_{VRB} - S$.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

The present invention is applicable to a transmitter and a receiver used in a broadband wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for detecting a resource indication value (RIV) indicating a start index (S) of consecutive virtual resource blocks (VRBs) and a length (L) of the consecutive VRBs in a wireless mobile communication system, the method comprising:

receiving downlink control information including resource block allocation information, wherein the downlink control information is common information for plural users; and detecting the resource indication value (RIV) from the resource block allocation information, wherein, if $Y-1 \leq \lfloor X/2 \rfloor$, the resource indication value (RIV) is denoted by $RIV = X(Y-1) + Z$, or else the resource indication value (RIV) is denoted by $RIV = X(X-Y+1) + (X-1-Z)$, where X is denoted by $X = \lfloor N_{VRB}/G \rfloor$, Y is denoted by $Y = L/G$, and Z is denoted by $Z = S/G$, in which, L is the length of the consecutive virtual resource blocks (VRBs), S is the start index of the consecutive virtual resource blocks (VRBs), $N_{VRB}$ is the number of virtual resource blocks (VRBs), L is a multiple of G, S is a multiple of G, and G is a natural number that is equal to or larger than 2.

2. The method according to claim 1, wherein a length ($N_{bit\_required}$) of a bit field used for transmitting the resource indication value (RIV) is denoted by $N_{bit\_required} = \lceil \log_2(RIV_{max}+1) \rceil$ and the bit field is transmitted from a base station of the wireless mobile communication system to the mobile station of the wireless mobile communication system, where $RIV_{max}$ is denoted by $RIV_{max} = \lfloor N_{VRB}/G \rfloor \cdot (\lfloor N_{VRB}/G \rfloor + 1)/2 - 1$.

3. The method according to claim 1, wherein G is 2 or 4 (G=2 or 4).

4. The method according to claim 1, wherein the start index (S) is any one of elements of a first set $\{s: s = mG < \lfloor N_{VRB}/G \rfloor \cdot G\}$ and the length (L) is any one of elements of a second set $\{l: l = nG \leq \lfloor N_{VRB}/G \rfloor \cdot G\}$, where m is an integer of 0 or higher, and n is a natural number.

5. The method according to claim 1, wherein the resource block allocation information indicates a set of distributed VRBs (DVRBs).

6. An apparatus of detecting a resource indication value (RIV) indicating a start index (S) of consecutive virtual resource blocks (VRBs) and a length (L) of the consecutive VRBs in a wireless mobile communication system, the apparatus comprising:

a receiver configured to receive downlink control information including resource block allocation information, wherein the downlink control information is common information for plural users; and a processor configured to detect the resource indication value (RIV) from the resource block allocation information, wherein, if $Y-1 \leq \lfloor X/2 \rfloor$, the resource indication value (RIV) is denoted by $RIV = X(Y-1) + Z$, or else the resource indication value (RIV) is denoted by $RIV = X(X-Y+1) + (X-1-Z)$, where X is denoted by $X = \lfloor N_{VRB}/G \rfloor$, Y is denoted by $Y = L/G$, and Z is denoted by $Z = S/G$, in which, L is the length of the consecutive virtual resource blocks (VRBs), S is the start index of the consecutive virtual resource blocks (VRBs), $N_{VRB}$ is the number of virtual resource blocks (VRBs), L is a multiple of G, S is a multiple of G, and G is a natural number that is equal to or larger than 2.

7. The apparatus according to claim 6, wherein G is 2 or 4 (G=2 or 4).

8. The apparatus according to claim 6, wherein a length ($N_{bit\_required}$) of a bit field used for transmitting the resource indication value (RIV) is denoted by $N_{bit\_required} = \lceil \log_2(RIV_{max}+1) \rceil$, where $RIV_{max}$ is denoted by $RIV_{max} = \lfloor N_{VRB}/G \rfloor \cdot (\lfloor N_{VRB}/G \rfloor + 1)/2 - 1$.

9. The apparatus according to claim 6, wherein the start index (S) is any one of elements of a first set $\{s: s = mG < \lfloor N_{VRB}/G \rfloor \cdot G\}$ and the length (L) is any one of elements of a second set $\{l: l = nG \leq \lfloor N_{VRB}/G \rfloor \cdot G\}$, where m is an integer of 0 or higher, and n is a natural number.

10. The apparatus according to claim 6, wherein the resource block allocation information indicates a set of distributed VRBs (DVRBs).

* * * * *